United States Patent
Kusukame et al.

(10) Patent No.: US 10,318,994 B2
(45) Date of Patent: *Jun. 11, 2019

(54) INFORMATION PROVIDING METHOD

(71) Applicant: Panasonic Intellectual Property Corporation of America, Torrance, CA (US)

(72) Inventors: Koichi Kusukame, Nara (JP); Ryo Kitamura, Kanagawa (JP); Tetsuji Fuchikami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 300 days.

This patent is subject to a terminal disclaimer.

(21) Appl. No.: 14/373,716

(22) PCT Filed: Nov. 6, 2013

(86) PCT No.: PCT/JP2013/006546
§ 371 (c)(1),
(2) Date: Jul. 22, 2014

(87) PCT Pub. No.: WO2014/083779
PCT Pub. Date: Jun. 5, 2014

(65) Prior Publication Data
US 2015/0032505 A1    Jan. 29, 2015

Related U.S. Application Data

(60) Provisional application No. 61/829,508, filed on May 31, 2013.

(30) Foreign Application Priority Data

Nov. 30, 2012 (JP) ................................ 2012-263464

(51) Int. Cl.
G06Q 30/02 (2012.01)
H04L 12/28 (2006.01)

(52) U.S. Cl.
CPC ..... *G06Q 30/0269* (2013.01); *G06Q 30/0201* (2013.01); *G06Q 30/0202* (2013.01);
(Continued)

(58) Field of Classification Search
CPC ........... G06Q 30/0269; G06Q 30/0201; G06Q 30/0202; G06Q 30/0251; G06Q 30/0255; G06Q 30/0261; G06Q 30/0267
(Continued)

(56) References Cited

U.S. PATENT DOCUMENTS 5,881,231 A * 3/1999 Takagi .................... H04L 29/06
370/235
6,243,755 B1 * 6/2001 Takagi .................... H04L 29/06
709/201
(Continued)

FOREIGN PATENT DOCUMENTS

JP    2002-320246    10/2002
JP    2002-342367    11/2002
(Continued)

OTHER PUBLICATIONS

Meeuwissen et al., Inferring and Predicting Context of Mobile Users, 2007, Bell Labs Technical Journal, 12(2), 79-86.*
(Continued)

*Primary Examiner* — Christine M Behncke
*Assistant Examiner* — Shelby A Turner
(74) *Attorney, Agent, or Firm* — Wenderoth, Lind & Ponack, L.L.P.

(57) ABSTRACT

Provided is an information providing method for generating and providing information, in accordance with: lifestyle information obtained by a lifestyle information obtaining
(Continued)

unit receiving, from each of plural devices used by plural users, information on a state of operation of the device; and location information of each user traveled, which is obtained by a location information obtaining unit receiving the location information.

14 Claims, 24 Drawing Sheets

(52) U.S. Cl.
CPC ..... *G06Q 30/0251* (2013.01); *G06Q 30/0255* (2013.01); *G06Q 30/0261* (2013.01); *G06Q 30/0267* (2013.01); *H04L 12/282* (2013.01); *H04L 12/2829* (2013.01)

(58) Field of Classification Search
USPC .............................................. 705/7.31, 14.58
See application file for complete search history.

(56) References Cited

U.S. PATENT DOCUMENTS

| | | | | |
|---|---|---|---|---|
| 6,968,333 | B2* | 11/2005 | Abbott | G06F 17/30867 |
| 7,571,248 | B2 | 8/2009 | Kutsumi et al. | |
| 7,996,177 | B2 | 8/2011 | Tatsuta et al. | |
| 8,438,127 | B2* | 5/2013 | Kurata | G01C 21/20 |
| | | | | 706/48 |
| 8,918,284 | B2* | 12/2014 | Tokashiki | G01C 21/3484 |
| | | | | 345/619 |
| 9,038,134 | B1* | 5/2015 | Ackerman | H04L 63/08 |
| | | | | 726/2 |
| 2002/0107855 | A1 | 8/2002 | Nishi | |
| 2005/0286686 | A1* | 12/2005 | Krstulich | G06Q 30/0205 |
| | | | | 379/32.01 |
| 2006/0041445 | A1* | 2/2006 | Aaron | G09B 7/00 |
| | | | | 706/47 |
| 2006/0053219 | A1* | 3/2006 | Kutsumi | G06Q 30/02 |
| | | | | 709/224 |
| 2006/0230108 | A1 | 10/2006 | Tatsuta et al. | |
| 2007/0233631 | A1* | 10/2007 | Kobayashi | G06N 7/005 |
| | | | | 706/52 |
| 2009/0216616 | A1* | 8/2009 | Wang | G06Q 30/02 |
| | | | | 705/14.53 |
| 2011/0046792 | A1* | 2/2011 | Imes | F24F 11/006 |
| | | | | 700/278 |
| 2011/0202961 | A1* | 8/2011 | Asano | G08B 21/0423 |
| | | | | 725/46 |
| 2011/0314502 | A1* | 12/2011 | Levy | H04N 7/106 |
| | | | | 725/46 |
| 2012/0066168 | A1* | 3/2012 | Fadell | G05B 15/02 |
| | | | | 706/52 |
| 2013/0080362 | A1* | 3/2013 | Chang | G06Q 30/0255 |
| | | | | 706/21 |
| 2013/0263034 | A1* | 10/2013 | Bruck | G05D 23/1904 |
| | | | | 715/771 |
| 2013/0297551 | A1* | 11/2013 | Smith | G06N 5/02 |
| | | | | 706/48 |

FOREIGN PATENT DOCUMENTS

| | | |
|---|---|---|
| JP | 2003-308445 | 10/2003 |
| JP | 2004-185612 | 7/2004 |
| JP | 2006-293535 | 10/2006 |
| JP | 2007-264764 | 10/2007 |
| JP | 2008-272019 | 11/2008 |
| JP | 2012-112853 | 6/2012 |
| JP | 2012-141658 | 7/2012 |
| JP | 2012/159413 | 8/2012 |

OTHER PUBLICATIONS

Adomavicius et al., Personalization Technologies: A Process-Orientated Perspective, Oct. 2005, Communications of the ACM, vol. 48, No. 10, 83-90.*
Kortuem, Gerd; Fahim Kawsar; Daniel Fitton; Vasughi Sundramoor (2010). "Smart Objects as Building Blocks for the Internet of Things". IEEE Internet Computing. 14 (1): 44-51. doi:10.1109/mic.2009.143.*
Alam et al. "A Review of Smart Homes—Past, Present, and Future", IEEE Transactions on Systems, Man, and Cybernetics—Part C : Applications and Reviews, vol. 42, No. 6, Nov. 2012 (Year: 2012).*
International Search Report dated Dec. 3, 2013 in corresponding International Application No. PCT/JP2013/006546.

* cited by examiner

FIG. 19

| | Time | Fuel |
|---|---|---|
| Fastest route | 1:03 | 4.2 l |
| Shortest route | 1:05 | 4.1 l |
| Energy-saving route | 1:12 | 3.7 l |
| Street-only route | 1:22 | 5.4 l |
| Multi-lavatory route | 1:34 | 5.5 l |

INFORMATION PROVIDING METHOD

TECHNICAL FIELD

The present invention relates to an information providing method for providing information based on demand forecasting for an item or a service.

BACKGROUND ART

In recent years, marketing is conducted which, for example, analyzes preferences or the like of a group at particular places for demand forecasting for items or services.

Moreover, a system is known which collects biometric information of individuals belonging to a group of people gathered around at a site of presentation or the like, and helps recognizing group feelings (see Patent Literature [PTL] 1)

CITATION LIST

Patent Literature

[PTL 1] Japanese Unexamined Patent Application Publication No. 2008-272019

SUMMARY OF INVENTION

Technical Problem

In the technology disclosed in PTL 1, however, demand forecasting is conducted only to an extent that it can be derived from situations of vital functions of individuals belonging to a group of people gathered around at a particular place.

Thus, the present invention provides an information providing method for providing, based on a plurality pieces of user information, information that is based on a result of demand forecasting for an item or a service and not necessarily correlated to the situations of the vital functions of each user.

Solution to Problem

The information providing method according to an aspect of the present invention is an information providing method for generating and providing information, in accordance with: lifestyle information obtained by a lifestyle information obtaining unit receiving, from each of plural devices used by plural users, information on a state of operation of the device; and location information of each user traveled, which is obtained by a location information obtaining unit receiving the location information.

Advantageous Effects of Invention

The information providing method according to the present invention can provide information that is based on a result of the demand forecasting and not necessarily correlated to the situation of the vital functions of each user.

BRIEF DESCRIPTION OF DRAWINGS

FIG. 19 is a diagram showing time which takes to arrive at destination and fuel required by route of travel.

DESCRIPTION OF EMBODIMENTS

Figure 1:
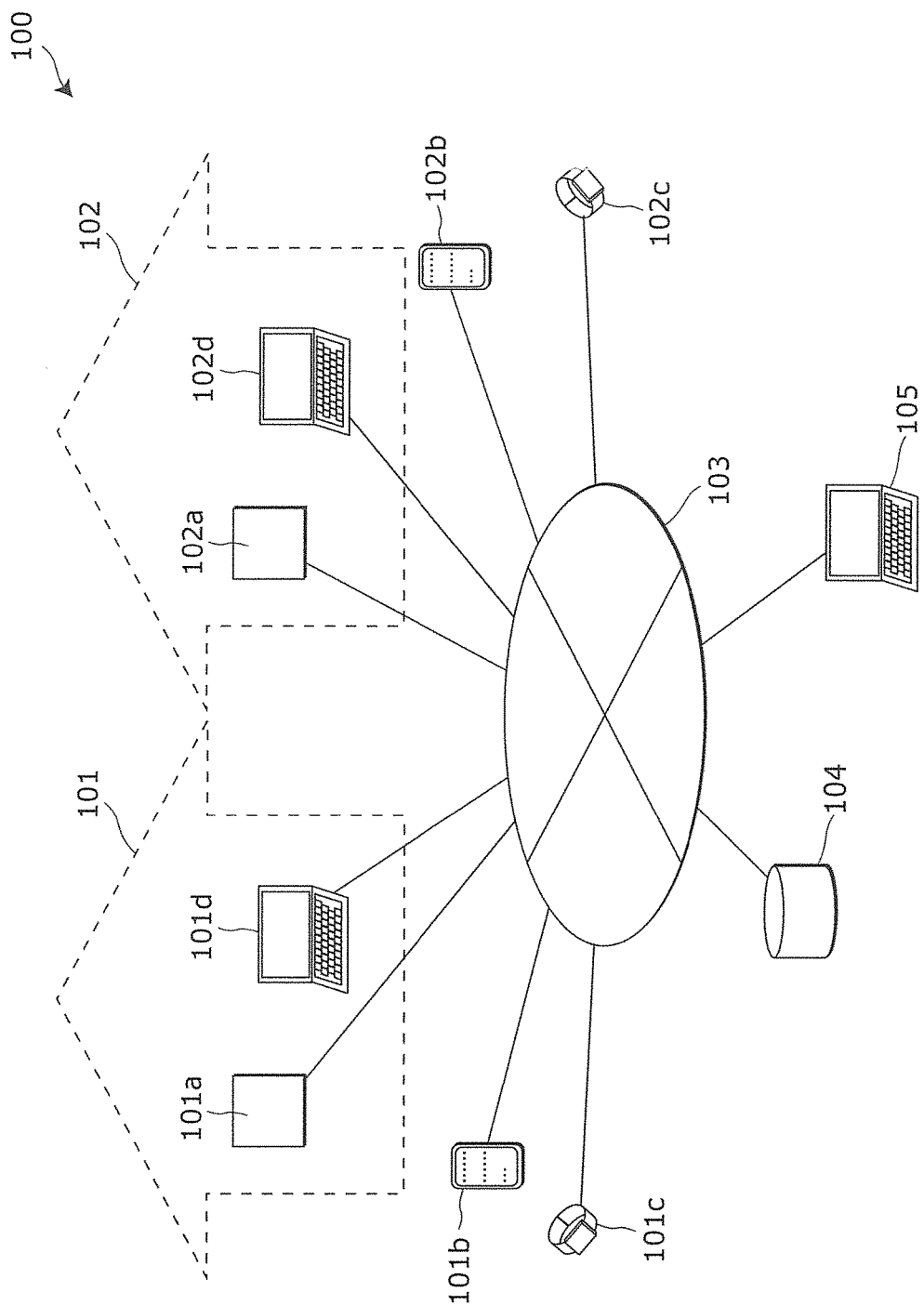
FIG. 1 is a schematic view of an information providing system according to an embodiment 1.

To provide information that is related to demand not necessarily correlated to the situation of the vital functions of each user based on a plurality of pieces of user information, the information providing method according to one aspect of the present invention is an information providing method for generating and providing information, in accordance with: lifestyle information obtained by a lifestyle information obtaining unit receiving, from each of plural devices used by plural users, information on a state of operation of the device; and location information of each user traveled, which is obtained by a location information obtaining unit receiving the location information.

According to this, the generated information is derived from the lifestyle information and the location information of the plural users. Thus, information that is based on a result of demand forecasting and not necessarily correlated to the situation of the vital functions of each user can be provided.

For example, the information providing method may include: (a) forecasting, by a processor, demand for a particular item or a particular service at a particular place, in accordance with the lifestyle information obtained by the lifestyle information obtaining unit and the location information obtained by the location information obtaining unit; and (b) generating information to be provided, based on a result of forecasting the demand in step (a).

According to this, proper demand forecasting can be made since it is based on the lifestyle information of each user whose place to move to is the particular place.

Also for example, the demand for the particular item or the particular service at the particular place may be forecasted in step (a), based on the number of users, among the plural users, who are predicted to be at the particular place in a future and whose likelihood of being in need for the particular item or the particular service is equal to or above a certain baseline, the number of users being obtained by: predicting, for each of the plural users, likelihood that the user is in need for the particular item or the particular service in the future from the obtained lifestyle information; and predicting, for each of the plural users, a location of the user in the future from the obtained location information.

According to this, the demand is forecasted based on the number of users who are predicted to be at a particular place in the future and in need for the particular item or a particular service. Thus, effective prediction can be expected.

Also for example, the plural devices each may have a function of providing an item that has a same attribute as the particular item or a service that has a same attribute as the particular service, and for each of the plural users, the likelihood that the user is in need for the particular item or the particular service in the future may be predicted in step (a), based on historical lifestyle information of the user obtained by the lifestyle information obtaining unit, the historical lifestyle information being stored in a storage medium for accumulating the lifestyle information.

It should be noted that coffee and canned coffee, for example, have a same attribute. Thus, demand for canned coffee can be derived from the lifestyle information related to coffee maker which has a function of providing coffee that has the same attribute as canned coffee. Moreover, demand for providing coffee at a cafe can be derived from the lifestyle information related to use of coffee maker which has a coffee provision function that has the same attribute as a service of providing coffee at cafe.

According to this, the demand can be reasonably forecasted and effective information can be provided.

Also for example, the information providing method may further include (c) attempting, for each of the plural users, to obtain consent from the user to obtain the lifestyle information from the device used by the user before the lifestyle information obtaining unit obtains the lifestyle information.

According to this, user privacy is concerned.

Also for example, in step (b), the information to be provided may be generated for each of the plural users, and the information may be generated, distinguishing between the plural users to whom the information is to be provided, so that the information provided to a user from which the consent is obtained in step (c), among the plural users, includes more content than the information provided to a user from which the consent is not obtained in step (c).

According to this, to collect a great number of pieces of information and provide more useful information, prompt can be made to the user to obtain consent from the user, and fairness between users can be ensured to some extent as well.

Also for example, in step (a), the demand may be forecasted also based on biometric information of each of the plural users which is obtained by a biometric information obtaining unit receiving the biometric information from a device which measures the user.

According to this, accuracy in prediction is enhanced, thereby providing more useful information.

Also for example, the location information obtaining unit may successively obtain the location information, and the demand may be successively forecasted in step (a).

According to this, practical and latest information can be provided in real time.

Also for example, in step (b), as the information to be provided, information representing a volume of the demand may be generated as a result of forecasting the demand in step (a).

According to this, information related to demand can be provided.

Also for example, user condition may be estimated by a processor for each of the plural users, in accordance with the lifestyle information obtained by the lifestyle information obtaining unit and the location information obtained by the location information obtaining unit, and information indicating on a map a location of a user, among the plural users, who is estimated to be in particular condition may be generated and provided.

According to this, information indicating places related to a particular condition of a user can be provided.

Also for example, user condition may be estimated for each of the plural users, based on the lifestyle information obtained by the lifestyle information obtaining unit, and information may be generated and provided distinguishing between the user conditions.

According to this, information which is useful to users in various conditions can be provided.

Moreover, a server according to one aspect of the present invention is a server including: a lifestyle information obtaining unit configured to obtain lifestyle information by receiving, from each of plural devices used by plural users, information on a state of operation of the device; a location information obtaining unit configured to obtain location information of each user traveled, by receiving the location information; and an information generation unit configured to forecast, using a processor, demand for a particular item or a particular service at a particular place, based on the lifestyle information obtained by the lifestyle information obtaining unit and the location information obtained by the location information obtaining unit, and generate information to be provided, based on a result of forecasting the demand.

According to the above configuration, the server collects, for each user, lifestyle information and location information of the user. Thus, information that is based on a result of demand forecasting and not necessarily correlated to the situation of the vital functions of each user can be provided.

These general and specific aspects includes a combination of one or more of a device, system, method, integrated circuit, computer program, or computer-readable recording medium.

Hereinafter, embodiments according to the present invention will be described with accompanying drawings.

It should be noted that the embodiments described below are merely preferred illustration of the present invention. Values, shapes, materials, components, disposition or connection between the components, and steps and the order of the steps are merely illustrative, and not intended to limit the present invention. Among components of the following embodiments, components not set forth in the independent claims indicating the top level concept of the present invention are will be described as components that can be added arbitrarily. The figures are schematic illustration and do not necessarily limit the present invention that precisely shown.

In each embodiment, mainly, an information providing method will be described which estimates patterns of user behavior, such as life situations, preferences, habits, by collecting information that is based on user manipulation of a home appliance, predicts user behavior in the future, and generates and provides beneficial information in response to a result of the prediction. Here, the prediction of the user behavior in the future includes, for example, forecasting of demand for an item or a service, such as action appetite for obtaining a particular item or action appetite for having the benefit of a particular service.

(Embodiment 1)

Hereinafter, an embodiment 1 which is an aspect of the present invention will be described.

FIG. 1 is a schematic view of an information providing system 100 according to the embodiment 1.

The information providing system 100 implements an information providing method as follows. Generally, the information providing method is a method of recording lifestyle information which is information on a state of operation of a home appliance which operates in response to user manipulation, estimating, based on the lifestyle information, patterns of user behavior in using the home appliance and predicting user behavior in the future, and providing information which is generated based on a result of the prediction and location information of the user. FIG. 1 shows the information providing system 100, with reference to an example, given two home appliance users at two houses.

As shown in FIG. 1, the information providing system 100 includes: home appliances 101a and 102a; mobiles 101b and 102b; wearable sensors 101c and 102c; information input terminals 101d and 102d; a network 103; and a server 104. The home appliances 101a and 102a are installed in respective two houses (a house 101 and a house 102). The mobiles 101b and 102b are owned by users of the respective appliances 101a and 102a. The wearable sensors 101c and 102c are worn by the users of the respective appliances 101a and 102a. The network 103, such as the Internet, enables these devices to be communicable with the server 104. The network 103 is connected to an information presentation device 105. Each device, which transmits information via the network 103, pre-stores therein destination information, such as an IP address of a device to transmit the information to.

Figure 2:
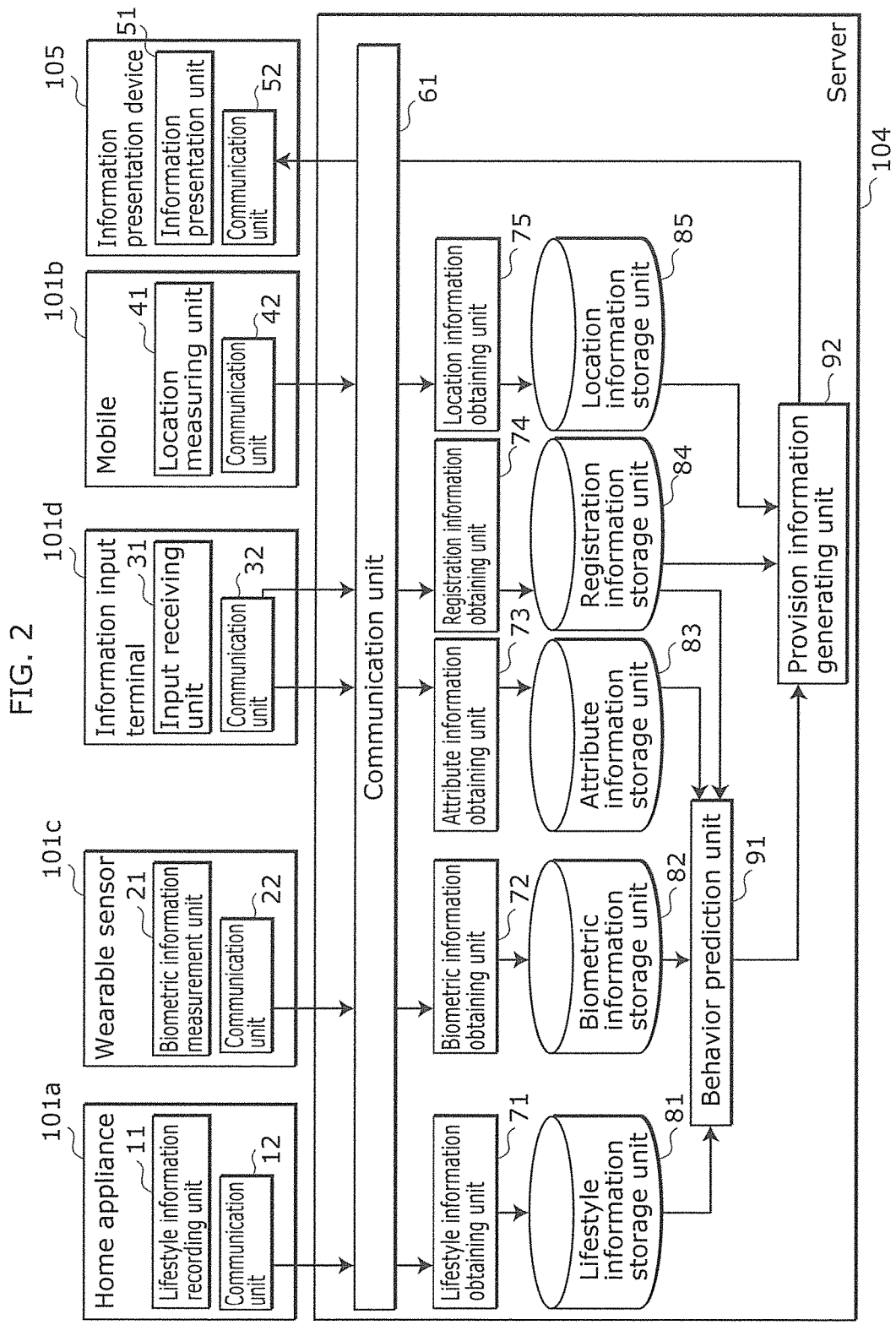
FIG. 2 is a functional block diagram of devices of the information providing system.

FIG. 2 is a functional block diagram of the devices of the information providing system 100. In the figure, the home appliance 101a, the mobile 101b, the wearable sensor 101c, the information input terminal 101d, and the server 104 are depicted and the other devices are omitted.

Here, the home appliances 101a and 102a are devices each of which includes a lifestyle information recording unit 11 and a communication unit 12. The lifestyle information recording unit 11 records lifestyle information which is information on a state of the home appliance when operates in response to user manipulation. The communication unit 12 includes a communication circuit and externally transmits the lifestyle information. In other words, the home appliances 101a and 102a are devices which connect to the network 103 via wireless or wired connection. For wireless connection, for example, wireless communication technology, such as Bluetooth (registered trademark) and a wireless LAN, is employed. It should be noted that the home appliances 101a and 102a may each have functionality of collecting and recording lifestyle information of the user from one or more other devices connected to the network 103. Examples of the home appliances 101a and 102a include appliances such as a coffee maker, a refrigerator, a TV, and a lighting fixture, or household equipment such as a toilet, a bath module, a washstand, or a combination thereof.

Examples of the lifestyle information recorded by the home appliance 101a or 102a include information associated with a time instant, such as manipulational information, operational status, power consumption, and output of various sensors mounted within the home appliance. The home appliances 101a and 102a each pre-store a unique home appliance ID (identification information) into an internal nonvolatile memory or the like. The communication unit 12 externally transmits the lifestyle information having the home appliance ID attached thereto.

The mobiles 101b and 102b each include a location measuring unit 41 and a communication unit 42. Examples of the mobiles 101b and 102b include mobile terminals, such as smartphones or tablets, which have location information acquisition capabilities that utilize location information of GPS or a Wi-Fi (registered trademark) router, a vehicle navigation device utilizing GPS, or a vehicle having the vehicle navigation device mounted therein. The mobiles 101b and 102b also connect to the network 103 via wireless or wired connection. For wireless connection, for example, a mobile phone network (3G/LTE) or Wi-Fi (registered trademark) is employed. The mobiles 101b and 102b each pre-store a unique mobile ID into an internal nonvolatile memory or the like. The communication unit 42 including a communication circuit externally transmits the location information having the mobile ID attached thereto.

The wearable sensors 101c and 102c each include a biometric information measurement unit 21 and a communication unit 22. The biometric information measurement unit 21 measures biometric information, such as body temperature and a heart rate. The communication unit 22 includes a communication circuit and externally transmits the biometric information. The wearable sensors 101c and 102c are worn on or embedded in a human body. Examples of the wearable sensors 101c and 102c include sensor devices such as an activity tracker, a heart rate monitor, a clinical thermometer, a respiratory rate measuring device, a glucose meter, and a sphygmomanometer.

The wearable sensors 101c and 102c also connect to the network 103 via wireless or wired connection. For wireless connection, for example, wireless communication technology, such as Bluetooth (registered trademark) and a wireless LAN, is employed. The wearable sensors 101c and 102c each pre-store a unique wearable sensor ID into an internal nonvolatile memory or the like. The communication unit 22 externally transmits the biometric information having the wearable sensor ID attached thereto.

The information input terminals 101d and 102d are computer terminals. The information input terminals 101d and 102d each include an input receiving unit 31 and a communication unit 32. The input receiving unit 31 receives input via a keyboard, a pointing device, a touch panel, or the like. The communication unit 32 includes a communication circuit and externally transmits information in response to the input. Examples of the information to be transmitted include registration information and attribute information. The registration information is information in which a home appliance ID of the home appliance, a mobile ID of a mobile owned by a user, and a wearable sensor ID of the wearable sensor for the user are linked to the user ID. The attribute information is information in which the age, gender, and the like of the user of the home appliance are associated with the user ID.

The server 104 is configured with a computer which includes a communication device, storage, a processor, and so on. The server 104 is a device which obtains various pieces of information via the network 103, generates information to be provided (provision information), by predicting behavior of the home appliance user, and provides the information presentation device 105 with the provision information. The various pieces of information are transmitted to the server 104 from the home appliances 101a and 102a, the wearable sensors 101c and 102c, the information input terminals 101d and 102d, and the mobiles 101b and 102b.

The server 104, in functional terms, includes a communication unit 61, a lifestyle information obtaining unit 71, a biometric information obtaining unit 72, an attribute information obtaining unit 73, a registration information obtaining unit 74, a location information obtaining unit 75, a lifestyle information storage unit 81, a biometric information storage unit 82, an attribute information storage unit 83, a registration information storage unit 84, a location information storage unit 85, a behavior prediction unit 91, and a provision information generating unit 92.

Here, the communication unit 61 includes a communication circuit. The communication unit 61 is a function unit which communicates with the devices connected thereto via the network 103. The lifestyle information storage unit 81, the biometric information storage unit 82, the attribute information storage unit 83, the registration information storage unit 84, and the location information storage unit 85 are each configured with a storage medium such as a memory and a hard disk.

The lifestyle information obtaining unit 71 has a function of obtaining, via the communication unit 61, the lifestyle information and the home appliance ID transmitted from the home appliance 101a or 102a and accumulating them in the lifestyle information storage unit 81. The lifestyle information to be accumulated is attached with time information such as a time at which the lifestyle information is measured by the home appliance 101a or 102a or a time instant obtained at the server 104, and is managed as historical lifestyle information. It should be noted that the lifestyle information obtaining unit 71 may be configured to encompass the reception capability of the communication unit 61, in which case, the lifestyle information obtaining unit 71 obtains the lifestyle information and so on by receiving them.

The biometric information obtaining unit 72 has a function of obtaining, via the communication unit 61, the biometric information and the wearable sensor ID which are transmitted from the wearable sensor 101c or 102c, and accumulating them into the biometric information storage unit 82. The biometric information to be accumulated is attached with time information such as a time at which the biometric information is measured by the wearable sensor 101c or 102c or a time instant obtained at the server 104, and is managed as historical biometric information.

The attribute information obtaining unit 73 has a function of obtaining, via the communication unit 61, the attribute information transmitted from the information input terminal 101d or 102d, and storing it into the attribute information storage unit 83. The registration information obtaining unit 74 has a function of obtaining, via the communication unit 61, the registration information transmitted from the information input terminal 101d or 102d, and storing it into the registration information storage unit 84.

The location information obtaining unit 75 has a function of obtaining, via the communication unit 61, the location information transmitted from the mobile 101b or 102b, and accumulating it into the location information storage unit 85. The location information to be accumulated is attached with time information such as a time at which the location information is measured by the mobile 101b or 102b or a time instant obtained at the server 104, and is managed as historical location information.

By the processor executing a control program which includes a prediction algorithm for predicting user behavior based on the lifestyle information, the biometric information, and the attribute information, the behavior prediction unit 91 implements the following function. In other words, the function is of predicting behavior of each user by, for example, estimating patterns of behavior of the user based on the lifestyle information and the biometric information respectively associated with the home appliance ID and the wearable sensor ID which are linked to the user ID, and the attribute information associated with the user ID. The behavior prediction unit 91 refers to the registration information stored in the registration information storage unit 84 to obtain correspondence of the lifestyle information, the biometric information, the attribute information, and so on with the registration information.

The prediction algorithm is predetermined for use. The algorithm, for example, analyzes the history of times, at which the home appliance is used by the user, at specific intervals (e.g., per day), based on the lifestyle information, estimates that the user has a habit of using the home appliance in a specific time slot, and predicts user behavior in the future, using a result of the estimation.

An example of a useful prediction algorithm is an algorithm which estimates that a user who has high probability of using a coffee maker in the morning has a habit of drinking coffee at home every morning, and predicts that the user is likely to drink coffee-related beverage while away from home on a day when the user does not drink coffee at home in the morning of the day.

It should be noted that in the prediction algorithm, as a method utilizing the history, characteristics may be utilized which are common to part of a specific time unit, such as a yearly basis, a weekly basis, or a daily basis, that defines a habit of a person. In the case of weekly basis, for example, characteristics common only to weekdays, such as from Monday to Friday, and characteristics common only to holidays, such as Saturday and Sunday, may be distinguished from each other to separately predict time slots where the user conducts a specific behavior between weekdays and holidays. In the case of yearly basis, characteristics common only to spring and summer and characteristics common only to fall and winter are distinguished from each other to separately predict time slots where the user conducts a specific behavior between spring and summer and fall and winter.

By the processor executing a control program which includes an information generation algorithm for generating provision information based on a result of the prediction by the behavior prediction unit 91 and the location information, the provision information generating unit 92 implements the following function. In other words, the function is of referring to the registration information of each user stored in the registration information storage unit 84 to predict a location where the user would move to in the future, based on the location information associated with the mobile ID linked to the user ID (e.g., based on a history which is a set of a plurality of pieces of location information having the measured times attached thereto). The function then predicts user behavior at a particular location in accordance with the prediction of user behavior in the future which is a result of the prediction by the behavior prediction unit 91, and generates the provision information in response to a result of the prediction of the user behavior at the particular location, and transmits the provision information to the information presentation device 105 via the communication unit 61. It should be noted that, herein, generating the provision information includes selecting, as the provision information, one of previously prepared pieces of information.

The information generation algorithm is predetermined. For example, the information generation algorithm predicts a location in the future of a user who is predicted to be likely to conduct a specific behavior in the future, and generates information to be provided to the user and others, in response to a result of the prediction. It should be noted that linear prediction or any other method may be used as an algorithm which predicts a location of the user at each time instant in the future, based on historical location information of the user (location information which indicates locations of the user at a plurality of time instants).

An example of a useful information generation algorithm is an algorithm which predicts a station to which a user predicted to be likely to drink coffee-related beverage would move in each time slot in the future, and then generates information on the number of sales of canned coffee at the station to be provided to the canned coffee drink distributor, or generates an advertisement of canned coffee or information on nearby cafe to be provided to the user.

The information generation algorithm may forecast demand for items and services which varies in hours, minutes, or seconds, using a plurality of pieces of location information of a plurality of users. As a result, the information generation algorithm can generate and provide information that is necessary to achieve optimal stock of items, provide effective advertisements, and provide convenient services, for example. It should be noted that the information generated by the information generation algorithm may be different for different users. Each user is allowed to know the information generated by the information generation algorithm, via a mobile terminal or the like owned by the user.

The information presentation device 105 is a computer terminal. The information presentation device 105 includes a communication unit 52 and an information presentation unit 51. The communication unit 52 includes a communication circuit and receives information transmitted from the server 104. The information presentation unit 51 presents the received information by displaying it on a display or outputting it in an audio format from a loudspeaker. The information presentation device 105 may be one or more portable smartphones and tablets, a TV installed at home, or a digital signage or the like. It should be noted that a particular operator may manage the information presentation device 105 and provide presented information as it is or after processing it to another operator, a device owned by a user, and a device installed at a particular place, for example.

In the following, operations of the devices of the information providing system 100 having the above configuration will be described.

Figure 3:
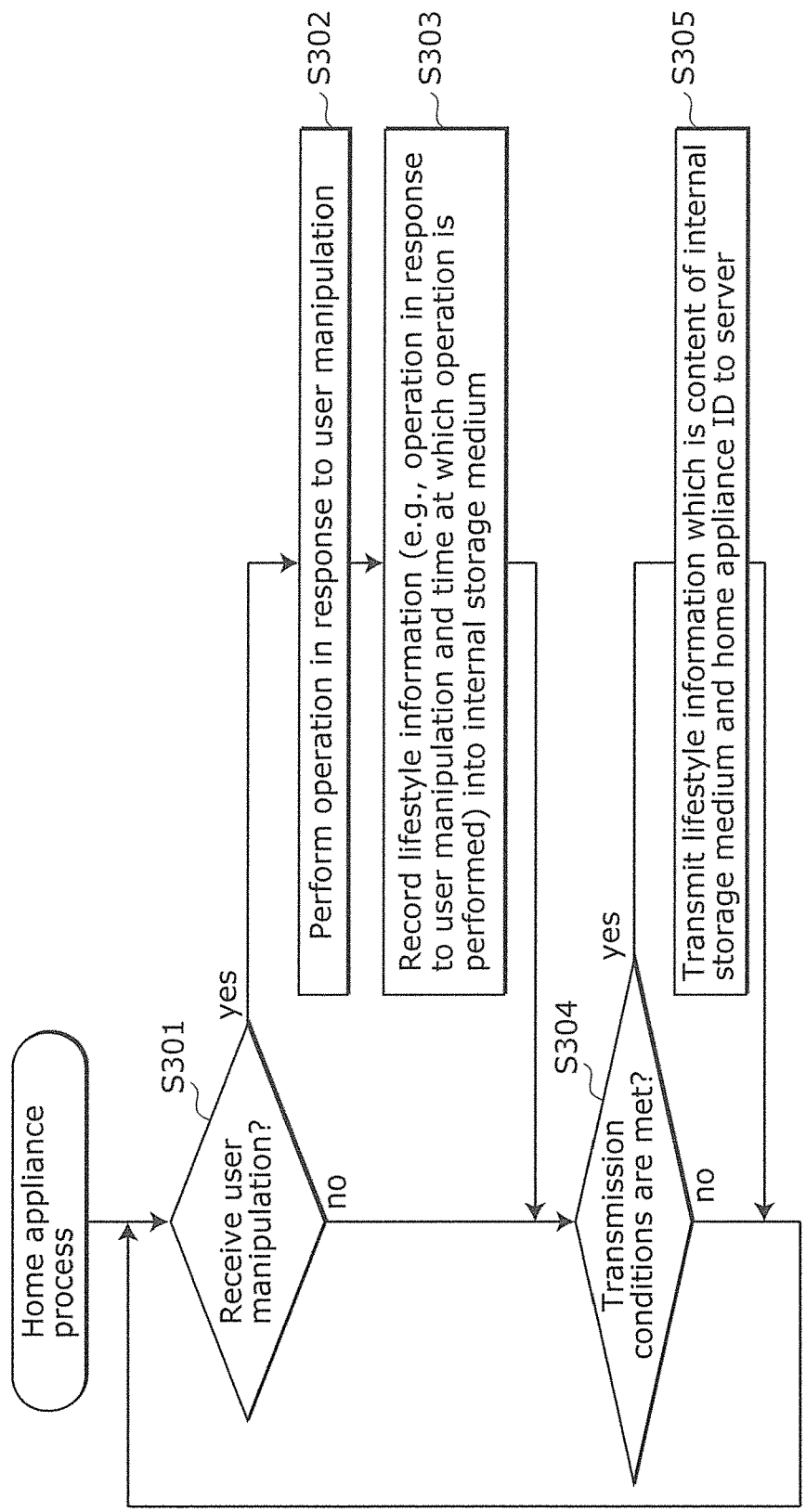
FIG. 3 is a flowchart illustrating a home appliance process which is performed by a home appliance.

FIG. 3 is a flowchart illustrating a home appliance process which is performed by the home appliance 101a. It should be noted that the home appliance process is performed by the home appliance 102a as well.

As illustrated in the figure, every time user manipulation is conducted (step S301), the home appliance 101a performs operation in response to the user manipulation (step S302). In the case where the home appliance 101a is a coffee maker, for example, the home appliance 101a performs processing, such as starts dripping down coffee by heating, in response to switch operation by the user. It should be noted that depending on the home appliance 101a, the home appliance 101a can operate accordingly, rather than independently in response to the user manipulation such as the above-mentioned processing. In the case where the home appliance 101a is a refrigerator, for example, the home appliance 101a transitions to a state where a door is open, in response to user manipulation of opening the door.

In operation, the home appliance 101a causes the lifestyle information recording unit 11 to record the lifestyle information, such as operation of the home appliance 101a in response to the user manipulation and a time at which the operation is performed, into an internal storage medium (step S303). In the case where the home appliance 101a is a coffee maker, the lifestyle information is information indicating, for example, a time at which a switch is turned on, i.e., a time at which the home appliance 101a starts dripping down coffee.

If transmission conditions are met (step S304), the communication unit 12 of the home appliance 101a transmits the lifestyle information which is content of the internal storage medium of the home appliance 101a and the home appliance ID to the server 104 via the network 103 (step S305). Examples of the transmission conditions include conditions for collectively transmitting the lifestyle information at predetermined time intervals, such as at arrival of a particular time everyday, conditions for collectively transmitting the lifestyle information at a time such as upon receipt of a request from the server 104, and conditions for collectively transmitting the lifestyle information in real time such as every time a user manipulation is performed. It should be noted that to meet the conditions for transmitting the lifestyle information upon receipt of a request from the server 104, the server 104 needs to be configured to successively issue a request at given time intervals, for example.

Figure 4:
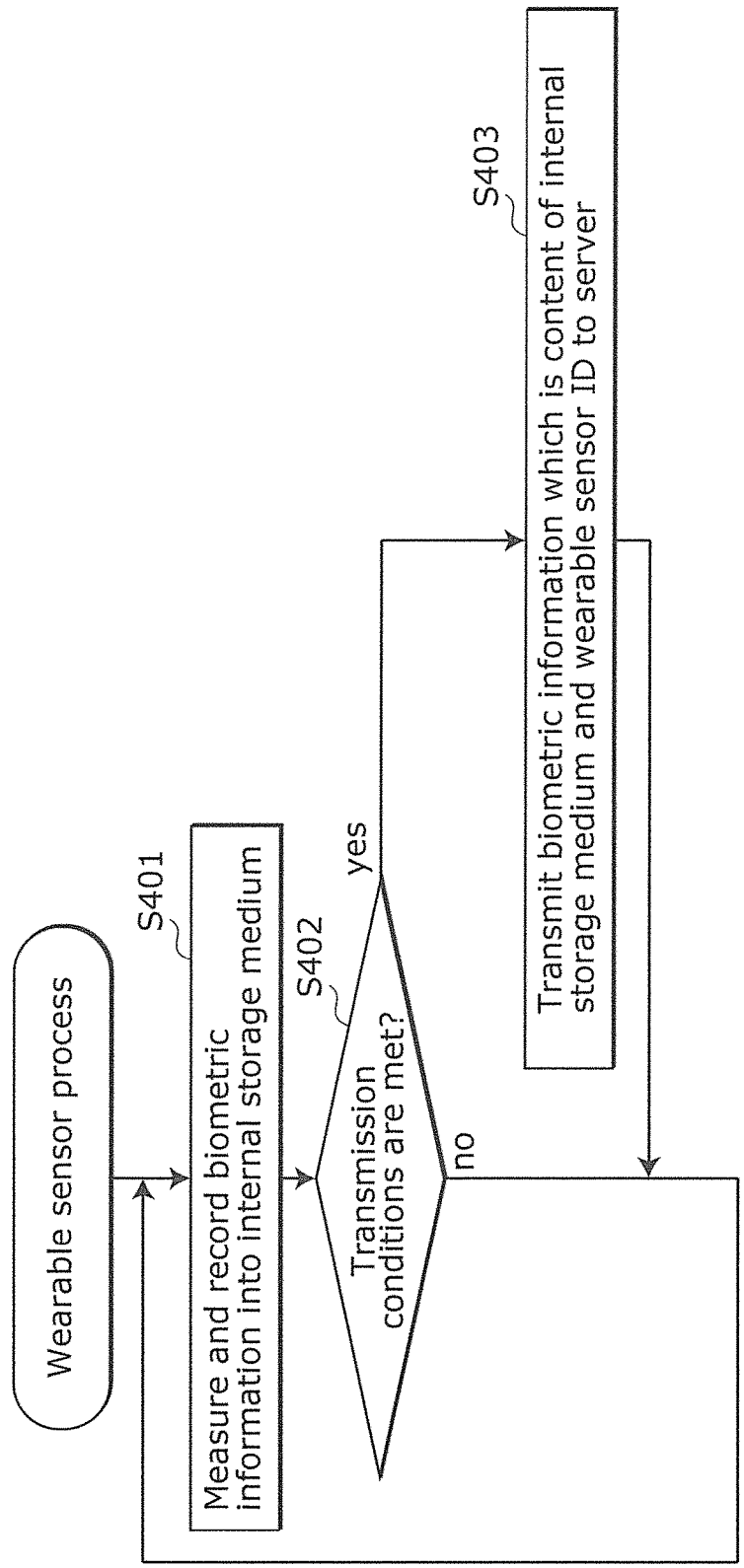
FIG. 4 is a flowchart illustrating a wearable sensor process which is performed by a wearable sensor.

FIG. 4 is a flowchart illustrating a wearable sensor process which is performed by the wearable sensor 101c. It should be noted that the wearable sensor process is performed by the wearable sensor 102c as well.

As illustrated in the figure, in the wearable sensor 101c being worn by the user, the biometric information measurement unit 21 measures and records biometric information, such as body temperature and a heart rate of the user, into an internal storage medium (step S401). The measurement and recording of the biometric information are repeated successively.

If transmission conditions are met (step S402), the communication unit 22 of the wearable sensor 101c transmits the biometric information which is content of the internal storage medium of the wearable sensor 101c and the wearable sensor ID to the server 104 via the network 103 (step S403). Examples of the transmission conditions include conditions for collectively transmitting the biometric information at predetermined time intervals, such as at arrival of a particular time everyday, conditions for collectively transmitting the biometric information at a time such as upon receipt of a request from the server 104, and conditions for transmitting biometric information every time the biometric information is measured. It should be noted that, in this transmission conditions also, to meet the conditions for transmitting the biometric information upon receipt of a request from the server 104, the server 104 needs to be configured to successively issue a request at given time intervals, for example.

Figure 5:
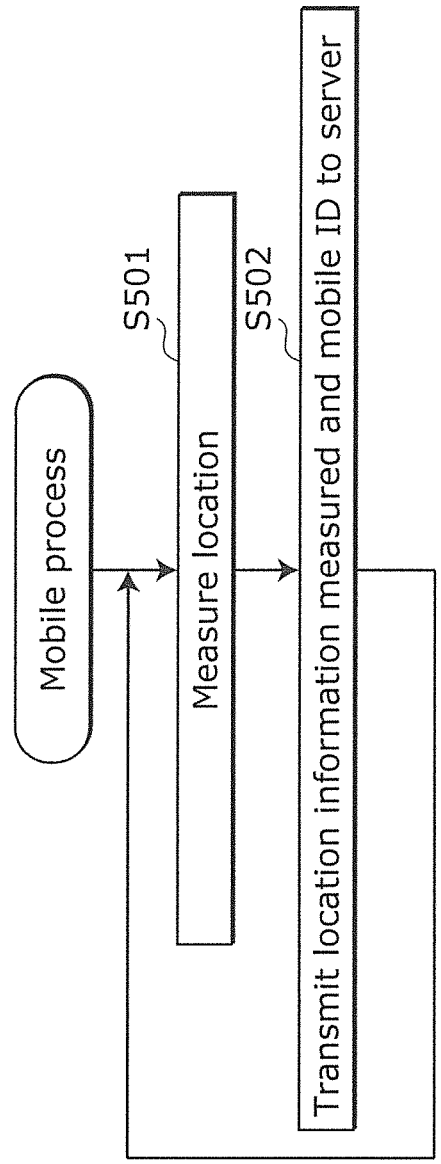
FIG. 5 is a flowchart illustrating a mobile process which is performed by a mobile.

FIG. 5 is a flowchart illustrating a mobile process which is performed by the mobile 101b. It should be noted that the mobile process is performed by the mobile 102b as well.

As illustrated in the figure, in the mobile owned by the user, the location measuring unit 41 having GPS functionalities or the like measures the location of the mobile, i.e., a location of the user (step S501). Then, the communication unit 42 transmits to the server 104 location information, which is a result of the measurement, and the mobile ID unique to the mobile stored in an internal nonvolatile memory or the like, via the network 103 (step S502). The measurement and transmission of location information are repeated successively.

Figure 6:
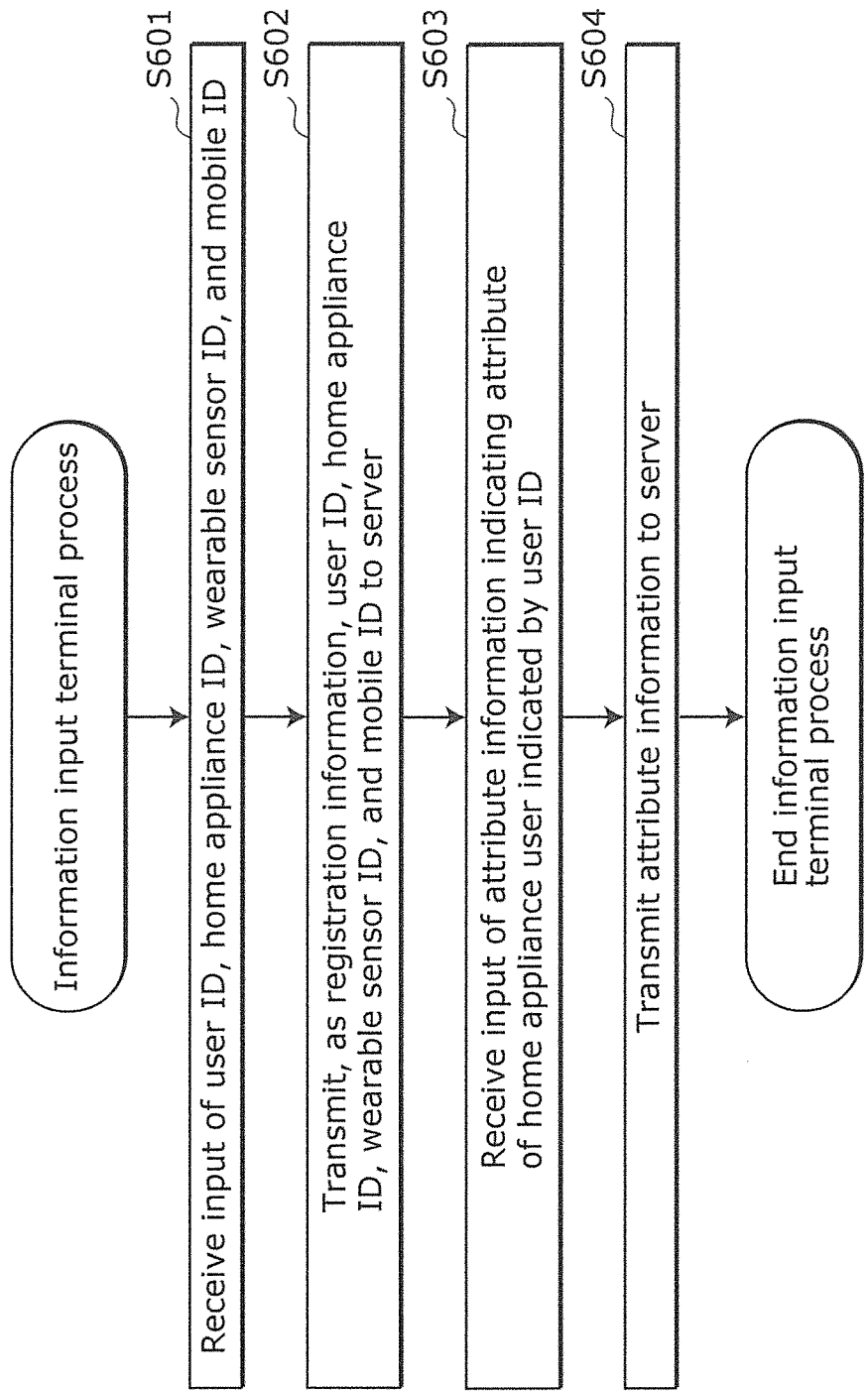
FIG. 6 is a flowchart illustrating an information input terminal process which is performed by an information input terminal.

FIG. 6 is a flowchart illustrating an information input terminal process which is performed by the information input terminal 101d. It should be noted that the information input terminal process is performed by the information input terminal 102d as well.

As illustrated in the figure, in the information input terminal 101d, the input receiving unit 31 receives input which is made via a keyboard or the like by the home appliance user to identify the user ID, the home appliance ID, the wearable sensor ID, and the mobile ID (step S601). The input is provided by direct input or selecting an option. Subsequently, the communication unit 32 transmits the user ID, the home appliance ID, the wearable sensor ID, and the mobile ID which are identified in response to the input, as registration information, to the server 104 via the network 103 (step S602). The transmission of the registration information is transmitted performed so that the server can identify a home appliance, a wearable sensor, and a mobile of each user. It should be noted that a user ID only needs to be information whereby a user can be identified.

In the information input terminal 101d, the input receiving unit 31 receives input of attribute information indicating the age, gender, and the like of the home appliance user (step S603), and the communication unit 32 transmits the attribute information to the server 104 via the network 103 (step S604).

Figure 7:
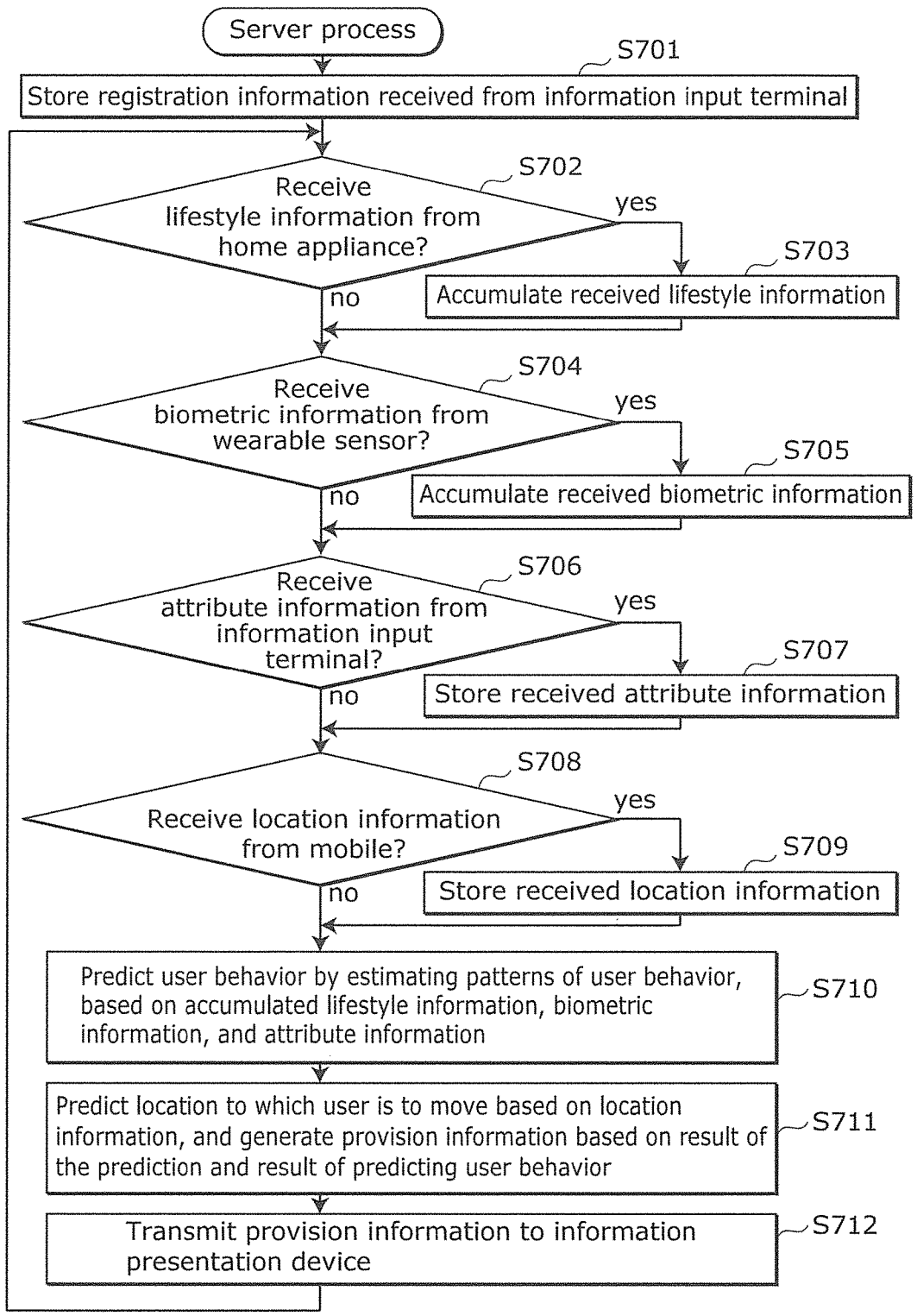
FIG. 7 is a flowchart illustrating a server process which is performed by a server.

FIG. 7 is a flowchart illustrating a server process which is performed by the server 104.

As illustrated in the figure, the registration information obtaining unit 74 of the server 104 receives the registration information from the information input terminals 101d and 102d via the communication unit 61, and stores the received registration information into the registration information storage unit 84 (step S701). This allows the server to know correspondence of each user with corresponding home appliance, wearable sensor, and mobile.

Subsequently, the server 104 repeatedly performs steps S702 to S712 to successively obtain information from each user and successively provide the information presentation device 105 with the provision information.

If the communication unit 61 receives lifestyle information having the home appliance ID attached thereto (step S702) the lifestyle information obtaining unit 71 of the server 104 stores the lifestyle information and the home appliance ID in association into the lifestyle information storage unit 81. In other words, the lifestyle information obtaining unit 71 accumulates the lifestyle information and the home appliance ID in association in a database in the lifestyle information storage unit 81 (step S703).

If the communication unit 61 receives biometric information having the wearable sensor ID attached thereto (step S704), the biometric information obtaining unit 72 stores the biometric information and the wearable sensor ID in association into the biometric information storage unit 82. In other words, the biometric information obtaining unit 72 accumulates the biometric information and the wearable sensor ID in association in a database in the biometric information storage unit 82 (step S705).

If the communication unit 61 receives attribute information (step S706), the attribute information obtaining unit 73 stores the attribute information into the attribute information storage unit 83 (step S707).

If the communication unit 61 receives location information having the mobile ID attached thereto (step S708), the location information obtaining unit 75 stores the location information and the mobile ID in association into the location information storage unit 85 (step S709).

The behavior prediction unit 91 predicts user behavior in the future by estimating patterns of user behavior, according to the above prediction algorithm (step S710). The behavior prediction unit 91 refers to the registration information stored in the registration information storage unit 84 to conduct the estimation and the prediction, based on the lifestyle information stored in the lifestyle information storage unit 81, the biometric information stored in the biometric information storage unit 82, and the attribute information stored in the attribute information storage unit 83.

Subsequently, the provision information generating unit 92 predicts, for each user, a location to which the user is to move, based on the location information stored in the location information storage unit 85. Then, the provision information generating unit 92 refers to the registration information stored in the registration information storage unit 84 to generate provision information based on a result of the prediction of user behavior corresponding to the predicted location to which the user is to move, according to the above information generation algorithm (step S711). Then, the communication unit 61 transmits the generated provision information to the information presentation device 105 via the network 103 (step S712). The provision information generating unit 92, successively, makes the prediction and generates the information, based on the location information or the like successively obtained. The information which varies in seconds, in minutes, in hours, in days, or in weeks, for example, is transmitted in real time conforming to the time unit.

While the information providing system 100 has been described above, with reference to the example given two home appliance users at two houses, the information providing system 100 can provide more useful information if the information providing system 100 is targeted at a larger number of users, e.g., three or more users. In this case, the server 104 obtains the lifestyle information, the biometric information, the attribute information, and the location information of each of the larger number of users, predicts the user behavior and the location to which the user is to move, and generates and provides information.

It should be noted that the server 104 may predict, for each of a plurality of users (preferably, a greater number of users), the likelihood that the user performs an action such as obtaining a particular item or having the benefit of a particular service, and predict the location to which the user, who is likely to perform such an action, is to move. This allows forecasting of the degree of demand for the particular item or the particular service at a particular place in a specific time slot. Thus, the server 104 may provide effective information, such as the number of sales of the particular item and an advertisement of the particular service, based on a result of the prediction.

In order that the information providing system 100 provides the information that is related to demand for a particular item or a particular service at a particular place, the prediction algorithm and the information generation algorithm may be as follows. In other words, the prediction algorithm estimates, for each of a plurality of users, patterns of behavior of the user from the lifestyle information of the user, and predicts the likelihood that the user is in need for the particular item or the particular service at a particular time (may be in a time slot or a multiple time points.) in the future. It should be noted that the prediction algorithm may perform the estimation from the biometric information and the attribute information, in addition to the lifestyle information. Moreover, the information generation algorithm also predicts, for each user, the location of the user at the particular time in the future from historical location information of the user. Then, the information generation algorithm sets the degree of demand for the particular item or the particular service, based on the number of users who would be in the particular place at the particular time in the future and whose likelihood of being in need for the particular item or the particular service is above a certain baseline.

Demand forecasting effectively works if an item or a service that is provided to the user from the corresponding home appliance 101a or 102a, which transmit the lifestyle information to the server 104, has the same attribute as that of the particular item or the particular service the demand for which is forecasted. Items having the same attribute or services having the same attribute include those recognized as been of the same type in view of users preference target.

For example, a coffee maker is a device which provides a user with coffee having the same attribute as canned coffee. Thus, the information providing system 100 can predict, based on coffee maker usage history, that the user, who is estimated to have high inclination to drink coffee at home every morning, would drink canned coffee elsewhere in that morning if the user did not drink coffee at home. Moreover, the information providing system 100 can predict a location to which the user is to move in that morning. Thus, by collecting a large number of pieces of such user information, the information providing system 100 can generate and present information which indicates, for example, the number of users who are predicted to come to a particular station and be likely to drink canned coffee on the morning of that day. It should be noted that the information providing system 100 may generate and present information which, for example, is indicated on a map, showing a distribution of current locations or future locations of users who are estimated to have high inclination to drink coffee every morning or those who are predicted to be likely to drink canned coffee on the morning of that day.

It should be noted that the home appliances 101a and 102a may transmit the lifestyle information to the server 104 via the mobiles 101b and 102b, respectively.

Moreover, when obtaining the lifestyle information, the biometric information, the location information, the attribute information, and the registration information which are related to the user, the server 104 may perform a consent step of obtaining consent from the user for user privacy. For example, the home appliances 101a and 102a, the mobiles 101b and 102b, the wearable sensors 101c and 102c, and the information input terminals 101d and 102d may perform the consent step once before transmitting all pieces of information on the user or every time before transmitting each piece of information. Devices which do not include user interfaces may cause another device to alternatively perform the consent step.

Figure 8:
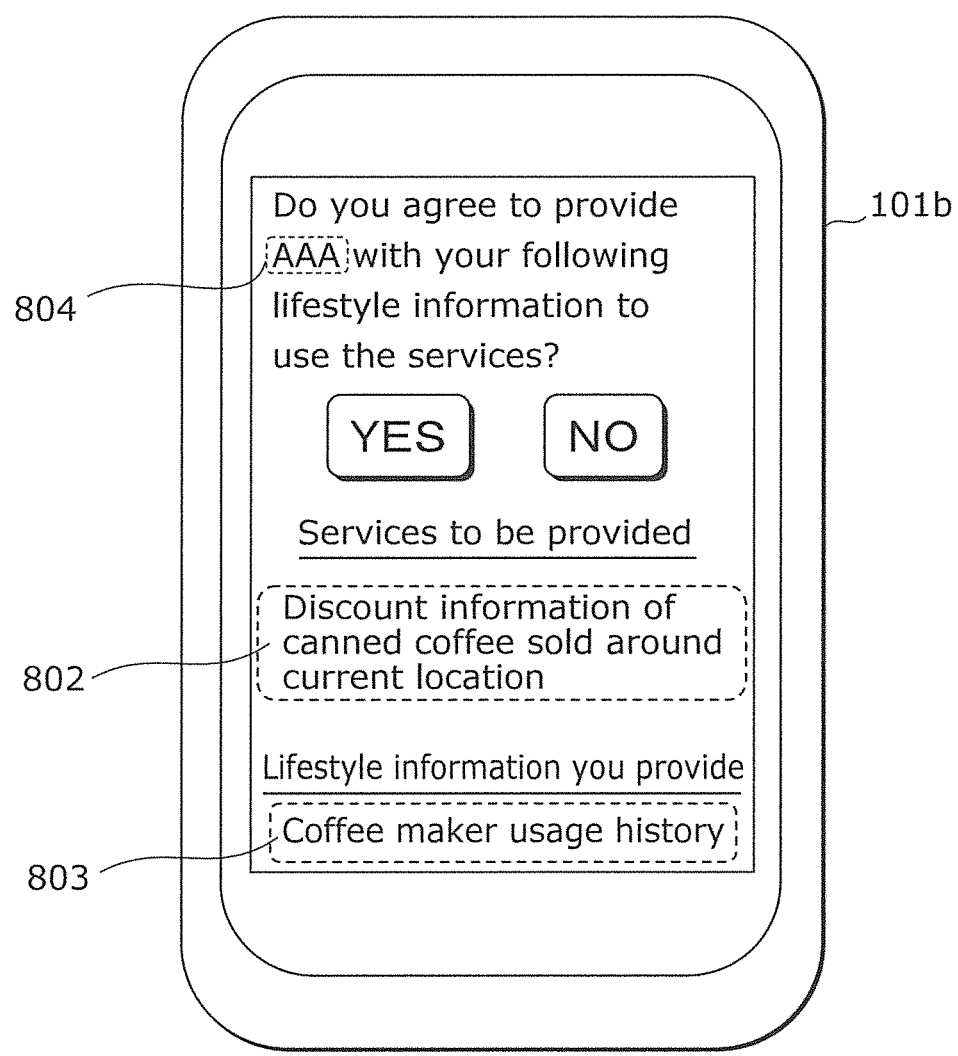
FIG. 8 is a diagram showing a GUI for obtaining consent of a user to provide lifestyle information on a mobile information terminal.

For example, given that the mobile 101b is a mobile information terminal which includes a display, the mobile 101b may obtain the consent from the user via the graphical user interface (GUI) shown in FIG. 8. This allows the server 104 to obtain, via the GUI, consent from the user to obtain the lifestyle information that is obtained from the home appliance 101a used by the user, or consent from the user to provide a service provider 804 ("AAA" in the figure), which is responsible for the server 104, with the lifestyle information.

Here, on the above-mentioned GUI, the service provider 804 to which the lifestyle information is provided, content 803 of the lifestyle information to be provided by the user, service content 802 to be provided by the service provider 804 may be displayed. This allows the user to be aware of the purpose for which the user provides the information and where the information is provided to, making it easier for the user to make decision whether to give consent. It should be noted that the above information generation algorithm may be configured such that information as to whether the consent is given from the user is stored in association with the registration information or the like into the server and the information providing system 100 provides more information to the user who has given the consent than those who have not.

Figure 9:
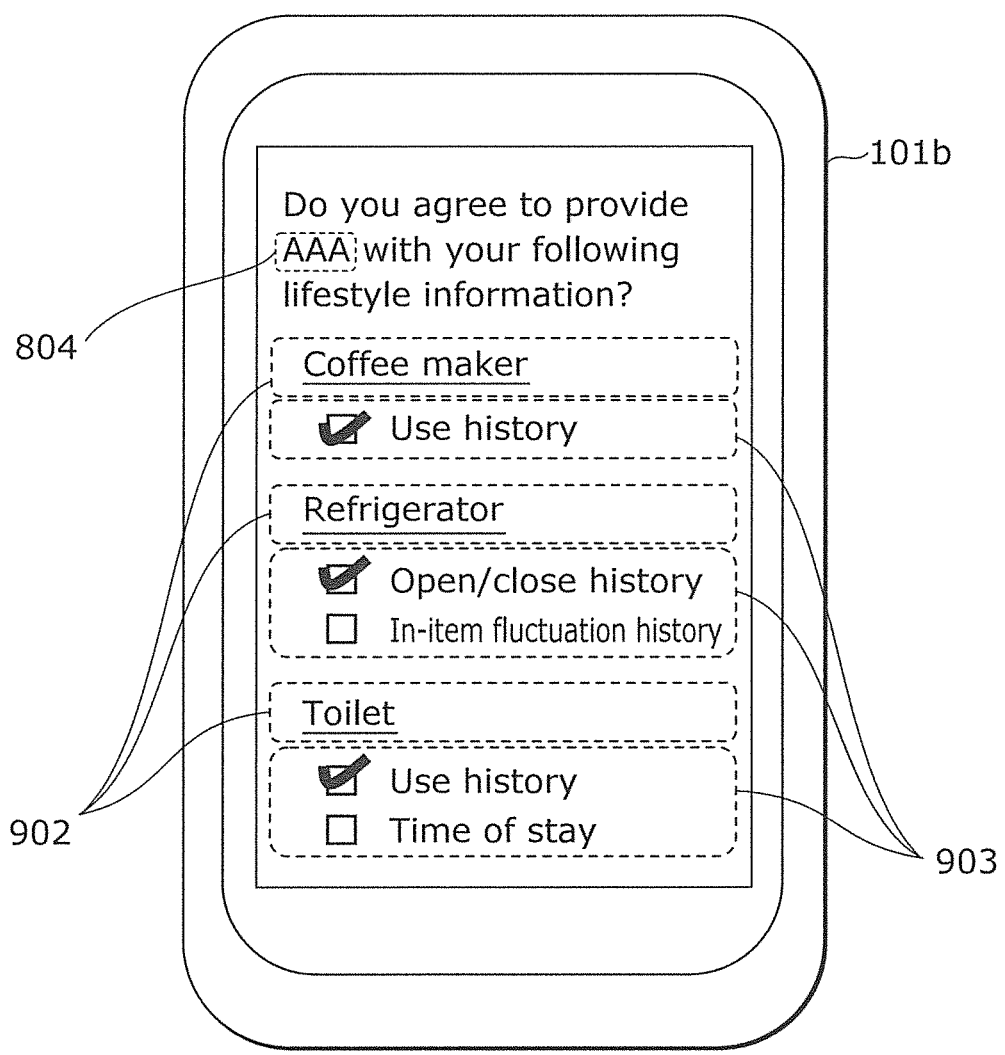
FIG. 9 is a diagram showing a GUI for obtaining selective consent of a user to provide various pieces of lifestyle information on a mobile information terminal.

Moreover, lifestyle information 903 obtained from the home appliance 101a used by the user may be presented via the GUI shown in FIG. 9, and the consent step may be performed where the user is allows to select, by clicking on a check box, lifestyle information to be presented to the service provider 804. FIG. 9 illustrates an example where the home appliance 101a is a combination of a coffee maker, a refrigerator, and a toilet, and the mobile 101b is a mobile information terminal which includes a display. The example of FIG. 9 requires consent from the user only once, thereby alleviating the burden for the user of confirmation operation.

Moreover, the mobile 101b, the information input terminal 101d, the information presentation device 105, and the server 104 described above may be integrated as a mobile 101e.

In the following, as a variation of the information providing system 100, a configuration will be described where the mobile 101b, the information input terminal 101d, the information presentation device 105, and the server 104 are integrated (the mobile 101e), focusing on differences from the information providing system 100 according to the embodiment 1.

Figure 10:
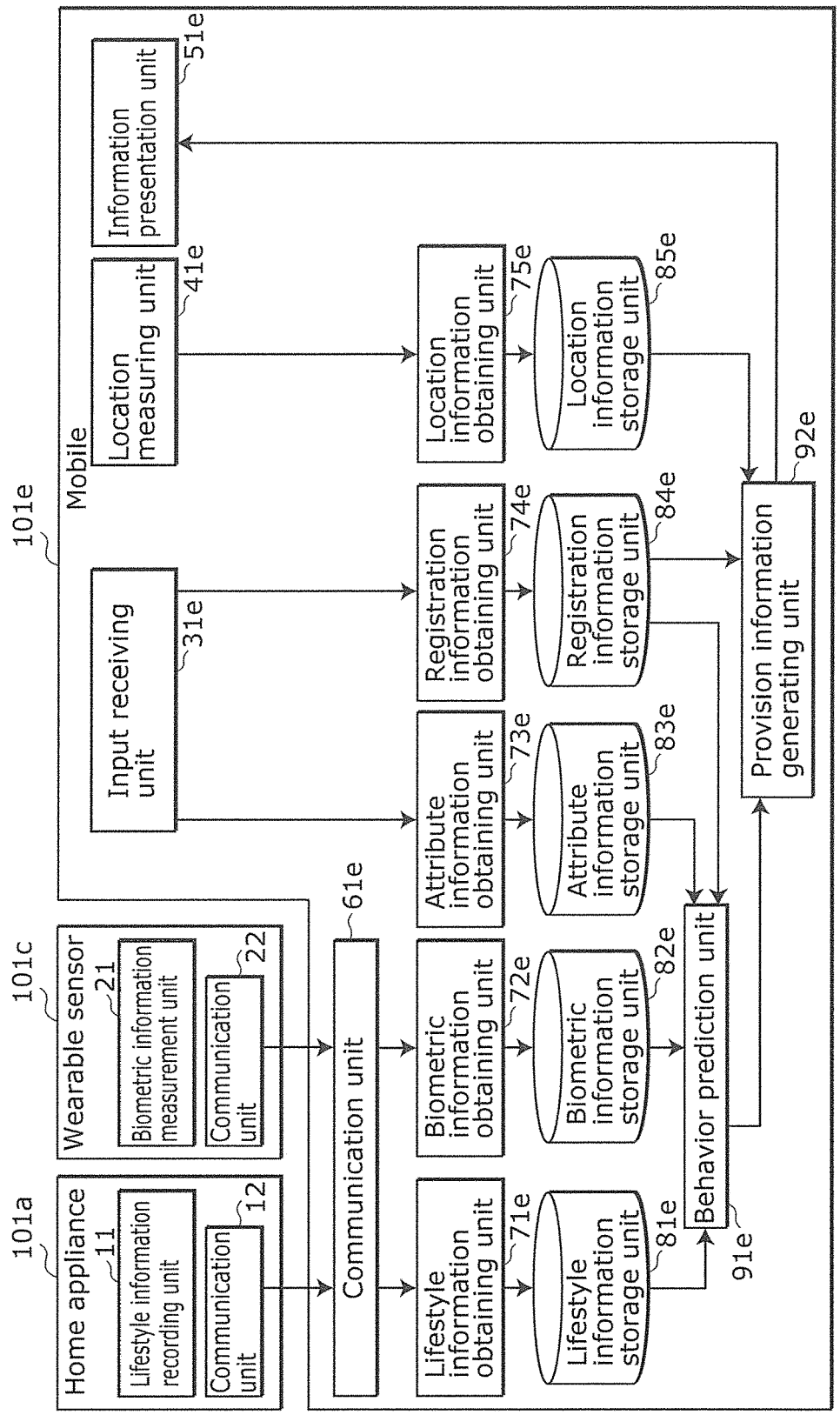
FIG. 10 is a functional block diagram, including a mobile, and a home appliance and a wearable sensor which cooperate with the mobile.

FIG. 10 is a functional block diagram, including the mobile 101e, and the home appliance 101a and the wearable sensor 101c which cooperate with the mobile 101e.

Examples of the mobile 101e include a mobile terminal such as a smartphone and a tablet, or a vehicle navigation device utilizing GPS or a vehicle having the vehicle navigation device mounted therein.

The mobile 101e includes an input receiving unit 31e, a location measuring unit 41e, a communication unit 61e, a lifestyle information obtaining unit 71e, a biometric information obtaining unit 72e, an attribute information obtaining unit 73e, a registration information obtaining unit 74e, a location information obtaining unit 75e, a lifestyle information storage unit 81e, a biometric information storage unit 82e, an attribute information storage unit 83e, a registration information storage unit 84e, a location information storage unit 85e, a behavior prediction unit 91e, a provision information generating unit 92e, and an information presentation unit 51e. The input receiving unit 31e receives input via a keyboard, a pointing device, a touch panel, or the like. The location measuring unit 41e generates location information of the mobile 101e, utilizing GPS. The communication unit 61e includes a communication circuit and communicates with the home appliance 101a and the wearable sensor 101c which are connected to the communication unit 61e via the network 103.

Here, the lifestyle information storage unit 81e, the biometric information storage unit 82e, the attribute information storage unit 83e, the registration information storage unit 84e, and the location information storage unit 85e are each configured with a storage medium such as a memory and a hard disk.

The lifestyle information obtaining unit 71e has a function of obtaining, via the communication unit 61e, the lifestyle information and the home appliance ID transmitted from the home appliance 101a, and accumulating them into the lifestyle information storage unit 81e. The lifestyle information to be accumulated is attached with time information such as a time at which the lifestyle information is measured by the home appliance 101a or a time instant obtained at the mobile 101e, and is managed as historical lifestyle information. It should be noted that the lifestyle information obtaining unit 71e may be configured to encompass the reception capability of the communication unit 61e, in which case, the lifestyle information obtaining unit 71e obtains the lifestyle information and so on by receiving them.

The biometric information obtaining unit 72e has a function of obtaining, via the communication unit 61e, the biometric information and the wearable sensor ID transmitted from the wearable sensor 101c, and accumulating them into the biometric information storage unit 82e. The biometric information to be accumulated is attached with time information such as a time at which the biometric information is measured by the wearable sensor 101c or a time instant obtained at the mobile 101e, and is managed as historical biometric information.

The attribute information obtaining unit 73e has a function of identifying, in response to the input received by the input receiving unit 31e, attribute information where the age, gender or the like of the user of the home appliance 101a are associated with the user ID, and storing the attribute information into the attribute information storage unit 83e.

The registration information obtaining unit 74e has a function of identifying, in response to the input received by the input receiving unit 31e, registration information where the home appliance ID of the home appliance 101a and the wearable sensor ID of the wearable sensor 101c are linked to the user ID, and storing the registration information into the registration information storage unit 84e.

The location information obtaining unit 75e has a function of obtaining location information from the location measuring unit 41e and accumulating it into the location information storage unit 85e. The location information to be accumulated is attached with time information such as a time at which the location information is measured, and is managed as historical location information.

By the processor executing a control program which includes a prediction algorithm for predicting user behavior based on the lifestyle information, the biometric information, and the attribute information, the behavior prediction unit 91e implements the following function. In other words, the function is of predicting user behavior by referring to the registration information to estimate patterns of user behavior based on the lifestyle information and the biometric information respectively associated with the home appliance ID and the wearable sensor ID which are linked to the user ID, and the attribute information that is associated with the user ID. The prediction algorithm is the same as that performed by the behavior prediction unit 91 of the server 104 described above, for example.

By the processor executing a control program which includes an information generation algorithm for generating provision information based on a result of the prediction by the behavior prediction unit 91e and the location information, the provision information generating unit 92e implements the following function. In other words, the function is of referring to the registration information of each user to predict a location where the user would move to in the future, based on the location information associated with the mobile ID linked to the user ID (e.g., a history which is a set of the location information having the measured times attached thereto). The function then predicts user behavior at a particular location in accordance with the prediction of user behavior in the future which is a result of the prediction by the behavior prediction unit 91e, and generates the provision information in response to a result of the prediction of the user behavior at the particular location, and presents the provision information via the information presentation unit 51e. It should be noted that the information generation algorithm is the same as that performed by the provision information generating unit 92 of the server 104 described above, for example.

The information presentation unit 51e includes a display or a loudspeaker, and has a function of displaying the provision information provided by the provision information generating unit 92e to the display or outputting it from the loudspeaker.

Figure 11:
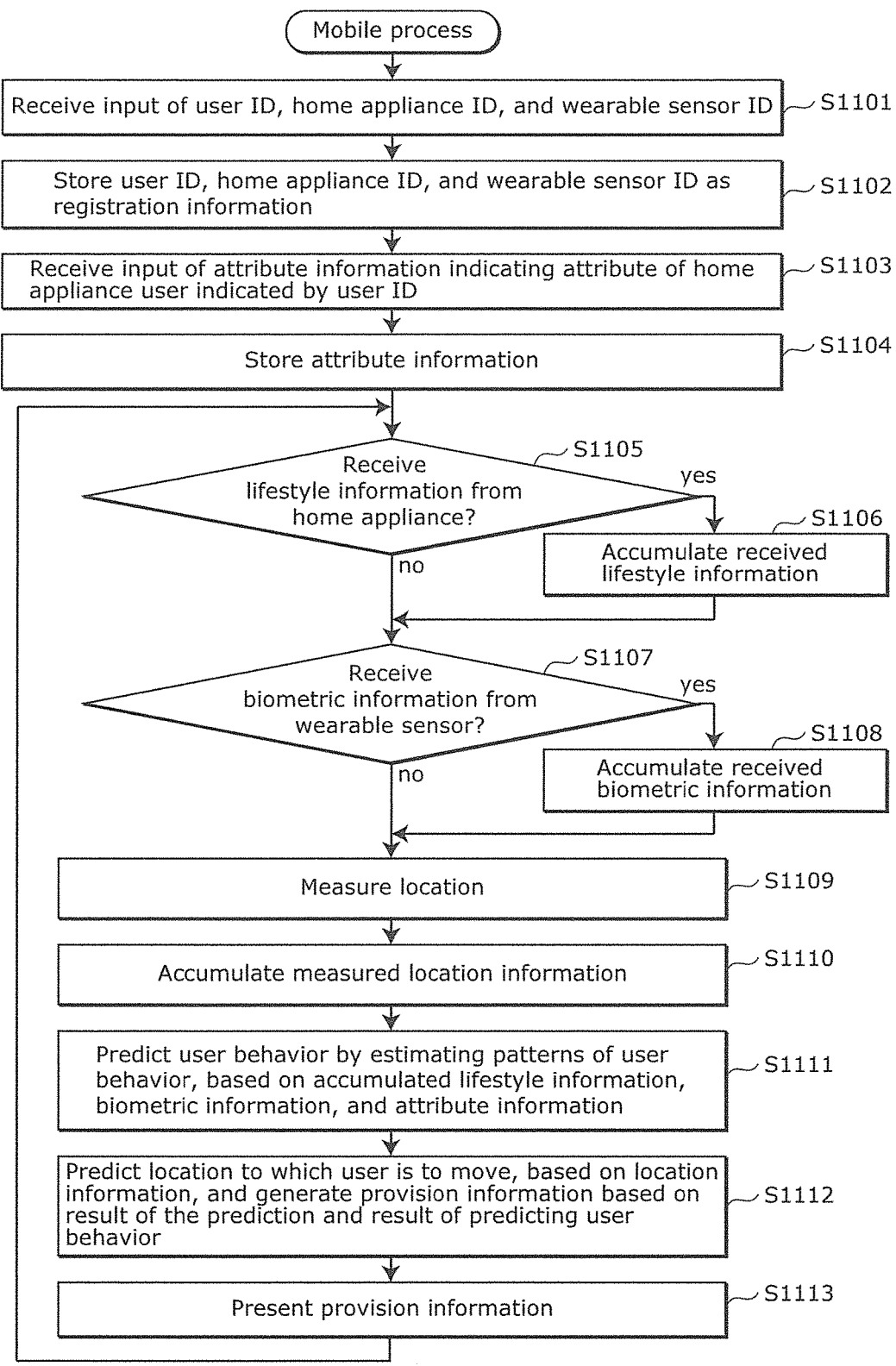
FIG. 11 is a flowchart illustrating a mobile process which is performed by the mobile.

FIG. 11 is a flowchart illustrating the mobile process which is performed by the mobile 101e.

As illustrated in the figure, the registration information obtaining unit 74e of the mobile 101e receives, via the input receiving unit 31e, input from the home appliance user made via a keyboard or the like to identify the user ID, the home appliance ID, and the wearable sensor ID (step S1101).

Then, the registration information obtaining unit 74e stores the user ID, the home appliance ID, and the wearable sensor ID, which are identified in response to the input, as registration information, into the registration information storage unit 84e (step S1102).

The attribute information obtaining unit 73e receives input of attribute information indicating, for example, the age and gender of the user via the input receiving unit 31e (step S1103), and stores the attribute information into the attribute information storage unit 83e (step S1104).

Subsequently, the mobile 101e repeatedly executes steps S1105 to S1113, thereby successively obtaining information from the user and successively present the provision information.

If the communication unit 61e receives the lifestyle information having the home appliance ID attached thereto (step S1105), the lifestyle information obtaining unit 71e of the mobile 101e accumulates the lifestyle information and the home appliance ID in association in the lifestyle information storage unit 81e (step S1106).

If the communication unit 61e receives the biometric information having the wearable sensor ID attached thereto (step S1107), the biometric information obtaining unit 72e accumulates the biometric information and the wearable sensor ID in association in the biometric information storage unit 82e (step S1108).

The location measuring unit 41e of the mobile 101e measures the location of the mobile 101e, i.e., the location of the user who owns the mobile 101e (step S1109), and the location information obtaining unit 75e obtains and accumulates location information, which is a result of the measurement, in the location information storage unit 85e (step S1110).

The behavior prediction unit 91e predicts user behavior in the future by estimating patterns of user behavior, according to the above prediction algorithm (step S1111). The behavior prediction unit 91e refers to the registration information stored in the registration information storage unit 84e to conduct the estimation and the prediction based on the lifestyle information stored in the lifestyle information storage unit 81e, the biometric information stored in the biometric information storage unit 82e, and the attribute information stored in the attribute information storage unit 83e.

Subsequently, the provision information generating unit 92e predicts a location to which the user is to move, based on the location information stored in the location information storage unit 85e. Then, the provision information generating unit 92e refers to the registration information stored in the registration information storage unit 84e to generate provision information based on a result of the prediction of the user behavior corresponding to the predicted location to which the user is to move, according to the above information generation algorithm (step S1112). The information presentation unit 51e then presents the generated provision information (step S1113).

It should be noted that the home appliance ID, the wearable sensor ID, the mobile ID, and the user ID may not be used if, rather than a plurality of users using the mobile 101e in turn, the mobile 101e is used only by one user.

In the information providing system, the mobile 101e can provide a user owning the mobile 101e with information such as a pinpoint advertisement highly effective to the user, according to the location of the mobile 101e, i.e., the location of the user. The highly effective pinpoint advertisement refers to targeted advertisements to users who seem more likely to purchase products than others. This can provide hopes for more sales, and, additionally, provide effects on reducing power consumption of the devices which provide information.

In the foregoing example, the mobile 101e (see FIG. 10) generates the provision information as a result of the prediction which is made by the behavior prediction unit 91e and the provision information generating unit 92e based on the lifestyle information and the location information, for example. Then, the information presentation unit 51e presents the provision information. Moreover, in the example described further above, similarly, the provision information is generated as a result of the prediction which is made by the behavior prediction unit 91 and the provision information generating unit 92 of the server 104 based on the lifestyle information and the location information, for example. Then, the information presentation device 105 presents the provision information. A system configuration is also possible which provides, instead of presenting such information, control of the operation of each device by supplying control information for controlling the device in response to a result of the prediction made based on the lifestyle information and the location information, for example.

Moreover, the wearable sensors 101c and 102c may be removed from the above-described information providing system and the biometric information may not be utilized. However, using the biometric information allows more accurate estimation of the user's situation and, as a result, the information providing system can provide more useful information. Moreover, similarly, the information input terminals 101d and 102d may be removed from the above-described information providing system and the attribute information and the registration information may not be utilized. When information is generated and provided based on lifestyle information of one user, there is no need to identify the user. Thus, the registration information can be unnecessary. Also, the identification information such as the home appliance ID, the wearable sensor ID, and the mobile ID can be replaced with the user ID, and if the information providing system is targeted at one user only, the identification information such as the home appliance ID is unnecessary.

It should be noted that the home appliances 101a and 102a, the wearable sensors 101c and 102c, the mobiles 101b and 102b or the mobile 101e in the above-described information providing system (see FIGS. 2 and 10) each may include means for identifying the user by receiving input of the user ID or by personal identification. Examples of the personal identification include face recognition, fingerprint recognition, and iris recognition. This enables to distinguish between users, allowing more accurate estimation of each user's situation. Thus, more useful information is provided. Moreover, the result of the personal identification may be used as replacement of the registration information described above.

Moreover, the functional partitioning between the behavior prediction units 91 and 91e and the provision information generating units 92 and 92e in the above-described information providing system is merely illustrative. The allocation of functions is changeable and the behavior prediction units 91 and 91e and the provision information generating units 92 and 92e may be integrated.

In the following, the embodiment 2 and the subsequent embodiments will described, with reference to specific examples of the information providing system described in the embodiment 1. In the embodiment 2 and the subsequent embodiments, the description already set forth in the embodiment 1 may not be repeated.

(Embodiment 2)

Hereinafter, coffee makers by way of example of the home appliances 101a and 102a in the above-described information providing system 100 will be mainly described, with reference to FIGS. 1 and 2.

In the information providing system according to the present embodiment, home appliances 101a and 102a, which are coffee makers, each include means (a detection mechanism) for detecting use of the home appliance by a user. Examples of the detection mechanism include means for monitoring power consumption, and a temperature sensor installed in the home appliance where heated when in use. A result of the detection (e.g., a detection time) by the detection mechanism is recorded as the lifestyle information into the lifestyle information recording unit 11, and the communication unit 12 transmits to the server 104 the lifestyle information and the home appliance ID for identifying the coffee maker, via the network 103. This allows the server 104 to obtain coffee maker usage history of each user (individual) or each house. The server 104 can predict user behavior from the coffee maker usage history, and provide the information presentation device 105 with information that is generated based on the prediction. The information presentation device 105 can be installed at, for example, public transportation or its surroundings and used.

It should be noted that the coffee maker may include a mechanism for recording information on power that is consumed by the coffee maker in use or a generated quantity of coffee. This allows information on a quantity of coffee drunk by the user to be included in the lifestyle information and utilized for the user behavior prediction by the server 104.

For example, a prediction algorithm assuming that the user would want to drink coffee after a given time has elapsed since the user has last used the coffee maker allows the server 104 to predict how much likely the user would drink coffee in the near future. From a result of the prediction and a result of predicting a location to which the user is to move in the near future, the server 104 can compute likelihood that the user purchases canned coffee at a store in a given station when the user comes to the station, generate provision information indicating the likelihood that the user purchases canned coffee, and the information presentation device 105 presents the provision information.

It should be noted that it can be estimated, for each user, whether the user is currently using public transportation, based on user location history and route maps of public transportation such as railways (path location information). Furthermore, use of location information of stations allows estimation of a station the user is to arrive at what time. Use of timetable information can further improve the precision in that estimation. It should be noted that the information generation algorithm may estimate, based on the historical location information of the user, that there is high probability that the user uses public transportation of the same path at the same time of the same day of a week, and predict a station at which the user is to subsequently make a transfer.

According to this, by obtaining lifestyle information, for each user, as to whether the user, who uses a station of public transportation, has used a coffee maker at home before going out, the likelihood that the user purchases canned coffee at a shop in the station can be predicted. Thus, for example, hourly sales of canned coffee at the station can be predicted, and presented at the information presentation device 105.

Also, more effective advertisements can be implemented, such as switching an advertisement presented by the information presentation device 105 at a given station to an advertisement of canned coffee for a time slot during which a large number of users, among those who use the given station, are predicted to be likely to purchase canned coffee.

Moreover, from coffee maker history of the users, the prediction algorithm may distinguish between users who use coffee makers more frequently than a certain baseline and those who use coffee makers less frequently than the certain baseline. The prediction algorithm may then determine that a user who uses the coffee maker more frequently than the certain baseline and did not use it before going out (i.e., a user in a situation where it has been a given time or more since the user last used the coffee maker) is likely to purchase canned coffee while away from home. Then, the information generation algorithm may generate information reflected the situation of the user to the likelihood that the user purchases canned coffee at a station.

Moreover, the wearable sensors 101c and 102c may be devices which measure a heart rate of a user (individual) and the prediction algorithm may predict that the user having a lower heart rate is more likely to purchase canned coffee. This is because it can be estimated that an individual having a low heart rate measured is sleepy. Moreover, the wearable sensors 101c and 102c may be devices which have capability of measuring body temperature of a user (individual), and the prediction algorithm may predict that a user having a higher body temperature measured is more likely to purchase canned coffee. This is because a user having a high body temperature measured can be estimated to be sleepy. A function may be previously set based on statistics and the like on the relationship between the biometric information, such as the body temperature and a heart rate, and the likelihood that the user purchases canned coffee, and the prediction algorithm may predict the likelihood that the user purchases canned coffee, based on the biometric information and the function.

Moreover, in addition to the coffee maker, the home appliances 101a and 102a according to the present embodiment may each include a sleep monitor (means which can measure sleep time) having communication functionalities. In this case, the lifestyle information includes sleep time, in addition to the coffee maker usage. The prediction algorithm may reflect sleep time to estimate that a user who has fewer hours slept the previous night is more likely to purchase canned coffee on the next day. This allows highly precise prediction on the likelihood that the user purchases canned coffee from the information of the coffee maker usage before the user goes out and the information on hours slept the previous night.

Moreover, an electronic payment system or the like may be used. Specifically, history of canned coffee purchase for each user (individual) at each station may be stored in the electronic payment system or the like, collected at the server and used in the prediction algorithm. Moreover, the prediction algorithm may distinguish between users who often purchase canned coffee and those who rarely purchase canned coffee to predict that a user who often purchases canned coffee and did not use a coffee maker before going out is likely to purchase canned coffee at a station. As a result, the information generation algorithm can generate information on sales of canned coffee at the station and the information presentation device 105 can present information based on a result of sales forecasting. Moreover, product names of canned coffee previously purchased by each user may be stored in the electronic payment system or the like and the information generation algorithm may generate a result of sales forecasting of each product, using the stored product names. As a result, the information presentation device 105 can present advertisements of canned coffee (product names) that may be sold on that day, by digital signage or the like installed at the station.

Moreover, in addition to the coffee maker, the home appliances 101a and 102a may each include a lighting fixture having communication functionalities. This allows the server 104 to collect lifestyle information also on lighting-on history. The prediction algorithm may estimate that the user has an infant in the household if the lighting is on every three to four hours at night, for example, and predict that the likelihood that the user purchases canned coffee is markedly low if the user is a woman. This allows more accurate sales forecasting of canned coffee. Moreover, a household with an infant can be derived from lighting on-time, and if the family is of a plurality of residents (users), for example, whether the resident (user) was hospitalized for giving birth or visited a hospital can be determined for each resident from GPS history of the resident.

Thus, whether a given user is a mother or a person who is other than a mother and living in the house can be determined. Moreover, the attribute information input to the information input terminal 101*d* may be information, such as, preference or whether a user is a mother, in addition to age and gender. This can determine and use the prediction algorithm to more accurately predict the likelihood of purchasing canned coffee based on the attribute information which is preference or whether the user is a mother of an infant.

The example of the information providing system has been described which provides information on sales forecasting of canned coffee where the home appliance 101*a* and 102*a* each include the coffee maker. The home appliance as a coffee maker is intended to supply coffee in connection with demand for coffee. Hence, the sales forecasting of canned coffee has a given connection with the sales of a product which is canned coffee, that is, demand for coffee, and is thus effective.

As such, the information providing system can predict user behavior (e.g., purchasing an item, having the benefit of a service) in connection with a particular item or a particular service which has the given connection with intended use of the home appliance 101*a* or 102*a*, and forecast demand for the particular item or particular service. The information providing system can then provide information that is related to the particular item or particular service. In this case, the home appliance has functionalities of providing an item having the same attribute as the particular item, or functionalities of providing a service having the same attribute as the particular service.

In the following, other examples of the information providing system will be described.

For example, the home appliances 101*a* and 102*a* may be toasters that have communication functionalities for externally communicating toaster usage. The toaster usage may be measured by monitoring power consumed by the toaster. The server 104 obtains information as to whether a user used the toaster before going out, via the network 103. The prediction algorithm predicts that a user who missed breakfast is likely to want a snack or the like in the near future. Then, the information generation algorithm estimates the number of users who missed breakfast and are to come to a particular station for each time slot and predicts sales of sandwiches (snack) and generates provision information reflected the sales of sandwiches. This, for example, generates provision information in which the percentage of time for which an advertisement of sandwiches is displayed is varied versus an advertisement of another product in response to a result of the prediction. This can display advertisements which are effective to users of the station on a given day or in a given time slot, using the information presentation device 105, such as digital signage, installed at the station, for example, changing the percentages of time for which the advertisement of sandwiches is displayed versus the advertisement of another product on a daily basis or for each time slot.

Moreover, the home appliances 101*a* and 102*a* may be other kitchen appliances than coffee makers and toasters. For example, by collecting the use history of kitchen appliances, such as induction cooktops and microwave ovens, the server 104 can estimate, by the prediction algorithm, a meal time slot of each user and predict a time at which the user would have a meal in the future. In this case, the information generation algorithm may also forecast demand for food-related products at a particular place, food services at restaurants, and the like, based on the estimation of a location to which the user moves at a time when the user wants food. Then, the information generation algorithm may generate provision information (such as advertisements of products and services) to be presented by the information presentation device 105 installed at the particular place, based on a result of the demand forecasting. The provision information may include information representing the demand in volume.

It should be noted that in the case where the wearable sensors 101*c* and 102*c* are glucose meters, the prediction algorithm can more accurately estimate the meal time, based on changes in blood glucose level of the user, in addition to the lifestyle information obtained from kitchen appliance, for example. Moreover, the wearable sensors 101*c* and 102*c* may be devices which measure a sound uttered by a user wearing the wearable sensor and transmits the sound as the biometric information. This allows, in the prediction algorithm, determination of, for example, the presence and absence of conversation, thereby determining whether the user is moving alone or the user is moving in a group. Thus, the prediction algorithm can more accurately predict whether the user is in a state where the user is likely to purchase a product or the like. Moreover, the wearable sensors 101*c* and 102*c* may be devices which measure and transmit, as the biometric information, the activity and a rate of steps taken, per unit time, by the user wearing the wearable sensor, for example. This allows, in the prediction algorithm, estimation of a level of user fatigue that has some correlation with the rate of steps and the activity. Thus, the prediction algorithm can more accurately predict whether the user is in a state where the user is likely to purchase nutritional drinks, sports drinks, or the like.

Moreover, the home appliances 101*a* and 102*a* may be TVs or radios which have communication functionalities, rather than being the devices for cooking and providing foods. In this case, the server 104 can obtain lifestyle information, for each user, as to whether the user used the TV or the radio before going out, via the network 103. Accordingly, the prediction algorithm may predict a user, who missed a news program on the TV or the radio before leaving for work, is likely to purchase a newspaper at a station, for example. Moreover, the information generation algorithm may generate, for each station, information indicating a time slot where a large number of users who are likely to purchase newspapers are present. This allows a vendor or the like to grasp, by seeing the information presentation device 105, newspaper sales at each station, thereby efficiently distributing newspapers. In other words, the information generation algorithm may be determined to forecast hourly sales of products and calculate the number of (predicted) stocks at each station, and cause the information presentation device 105 to display information generated based on the prediction and calculation. This allows proper inventory control such as providing inventory to a station having inventory shortage or to a station at inventory shortage from another station.

Moreover, the home appliances 101*a* and 102*a* may each be a bath module having communication functionalities, which can detect whether the bath is used, using an occupancy sensor which detects a bath or means for measuring use history of a lighting fixture. In this case, the server 104 can obtain lifestyle information, for each user, which indicates a bath situation of the user via the network 103. Thus, the prediction algorithm may, for example, estimate that a user, who did not have a bath on the previous day, is likely to have a slight cold, and predict that the user is likely to purchase cold medicines or nutritional drinks. This allows more effective advertisements, such as providing, if the user has a slight cold, an increased display time of advertisements of cold medicines and nutritional drinks by digital signage installed at stations. It should be noted that storing a long (e.g., a period longer than a month) record of a bath history of each user in the server 104 allows more accurate estimation of the likelihood that a user, who did not have a bath on the previous day, has a slight cold, in accordance with whether the user has a habit of having a bath everyday. In other words, the display time of advertisements of cold medicines or nutritional drinks can be more effectively set. In the case where the wearable sensors 101c and 102c have body temperature measurement functionalities, the server 104 can use information on body temperature collected to more accurately estimate whether a user has a slight cold. Then, given that the information presentation device 105 is a terminal which is carried with a user, the information presentation device 105 may effectively provide the user, who is estimated to have a slight cold, with advertisements of cold medicines and nutritional drinks.

Moreover, in the specific examples described in the present embodiment (examples where the home appliances are coffee makers and others) also, the mobile 101b, the information input terminal 101d, the information presentation device 105, and the server 104 shown in FIG. 2 may be integrated as the mobile 101e. In other words, the mobile 101e, such as a smartphone or a tablet, may have the following functions, in addition to the function of detecting the location of the mobile 101e, i.e., the location of the user owning the mobile 101e. The functions include a function of inputting the attribute information of the user, a function of predicting user behavior based on the prediction algorithm, a function of generating information to be provided to the user based on the information generation algorithm, and a function of presenting the generated information to the user (see FIG. 10). This allows the mobile 101e, which detects the location of the user, to effectively present the information (pinpoint advertisement) to the user.

Moreover, the information (pinpoint advertisement) to be presented to the user by the devices (the information presentation device 105, the mobile 101e) which have information presentation functions may be presented only to, among the users who provide the lifestyle information and the location information, users who are wishing for distribution of pinpoint advertisements, for example. For example, if such a user installs application which distributes pinpoint advertisements to smartphones and tables, a pinpoint advertisement is displayed on the device when the application is launched, for example.

Pinpoint advertisements allow the user to selectively receive advertisements of products which the user is likely to purchase, thereby reducing the number of times the user checks advertisements. The pinpoint advertisements can also reduce power consumed by the devices (such as a smartphone) that have the information presentation functions.

Figure 12:
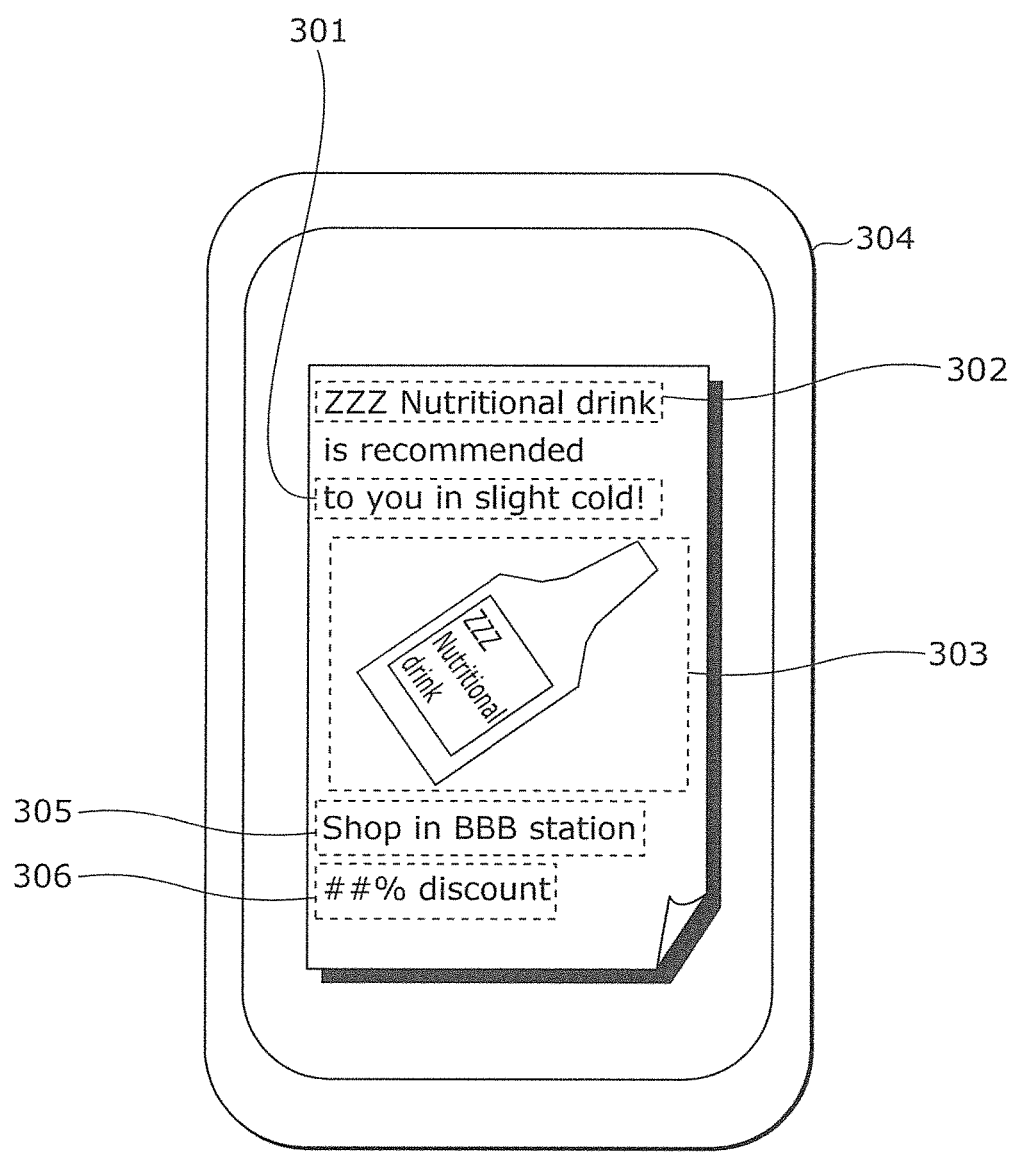
FIG. 12 is a diagram showing an example screen displaying a pinpoint advertisement on a smartphone.

FIG. 12 shows an example display displaying a pinpoint advertisement on a smartphone 304, by way of example display of the devices which have location detection function and the information presentation function.

The example display shown in FIG. 12 displays advertisements of nutritional drinks to a user who is determined to have a slight cold. The pinpoint advertisement, as illustrated in the figure, displays a product name 302 of a product advertized and an image 303, such as a picture of the product advertized, and provides description of condition 301 of the user, which is determined based on the lifestyle information and the biometric information. This allows the user, who receives the advertisement, to clearly understand the reason why the advertised product is recommended, thereby further motivating the user to purchase the product. Moreover, privileged information 306, such as discount and a privileged service, intended for the user who receives the advertisement may be provided. This can achieve effects of further motivating the user to purchase the product. Moreover, the privileged information 306 allows reaching a greater number of users who are wishing for distribution of pinpoint advertisements.

Moreover, information 305 on the location of a shop may be displayed based on user's location information obtained by a smartphone having a location detection function. This can save the user, who receives the advertisement, from searching a shop, thereby further increasing the likelihood that the user purchases the product. Moreover, although not shown, map information (image) of the shop may be additionally displayed. A nearest shop may be displayed, considering the current location of the user and a path of travel of the user in the future. Moreover, shops which have margins for inventory may be preferentially displayed, based on shops' inventory information.

(Embodiment 3)

Hereinafter, toilets by way of example of the home appliances 101a and 102a in the above-described information providing system 100 will be mainly described, with reference to FIGS. 1 and 2.

In the information providing system according to the present embodiment, home appliances 101a and 102a which are toilets (toilet bowls) in houses, each have communication functionalities and include means (a detection mechanism) for detecting use of the toilet by each user (individual). Examples of the detection mechanism include an occupancy sensor using an infrared, and a flow sensor which detects waste water. The toilet may include biometric identification means for separately identifying users in the house. This records the toilet usage history (e.g., time of use) for each user as the lifestyle information into the lifestyle information recording unit 11, and the communication unit 12 transmits the lifestyle information and a home appliance ID for identifying the toilet to the server 104 via the network 103. The server 104 can obtain toilet usage history for each user (individual) or for each house. The server 104 can predict user behavior from the toilet usage history, and provide the information presentation device 105 with information which is generated based on the prediction.

A prediction algorithm for predicting user behavior may distinguish applications of use of toilet (stool and urine) and refer to the toilet usage history, based on a time of stay for which the user uses the toilet. Distinguishing applications of use of toilet as such allows more accurate estimation of a situation of the user. If the toilet, additionally, includes means for conducting component analysis of body waste, the lifestyle information can be recorded more accurately distinguishing between stool and urine, thereby allowing the server 104 to more accurately estimate the situation of the user.

It should be noted that the home appliances 101a and 102a may not be household toilet bowls themselves but may each be a lighting fixture or a ventilating fan that has communication functionalities in the lavatory in the house. Using the use history of a lighting fixture or a ventilating fan as the lifestyle information allows the server 104 to estimate toilet usage of each user from the lifestyle information. Moreover, the home appliances 101a and 102a may not be toilet bowls and may be devices which include a toilet seat having communication functionalities. The lifestyle information which indicates use of toilet at home and obtained by the device detecting a sitting status of the user is sent to the server 104.

According to the information providing system in which the server 104 collects the use history of toilet at home for each user as the lifestyle information, the prediction algorithm executed by the server 104 can predict whether the user is in a state where the user wants to use a lavatory (a stall) while away from home. Moreover, the information generation algorithm executed by the server 104 can estimate for each user as to where the user who wants to use a lavatory (stalls) is traveling to, based on the historical location information of the user. The information generation algorithm can then predict a busy status of a lavatory (e.g., a waiting time for a lavatory (stall)) on a public transportation-by-public transportation basis, such as rails, or on a station-by-station basis. Information indicating the predicted busy status of a lavatory on the public transportation-by-public transportation basis or on the station-by-station basis is transmitted from the server 104 to the information presentation device 105 and displayed on a screen or output in audio by the information presentation device 105. According to the current location of the user, the provision information generating unit 92 may narrow down the information which is generated by the information generation algorithm and indicates a busy status of a lavatory at a station to information on a station nearest the user, and distribute the information to the information presentation device 105 which is a smartphone or the like of the user.

Figure 13:
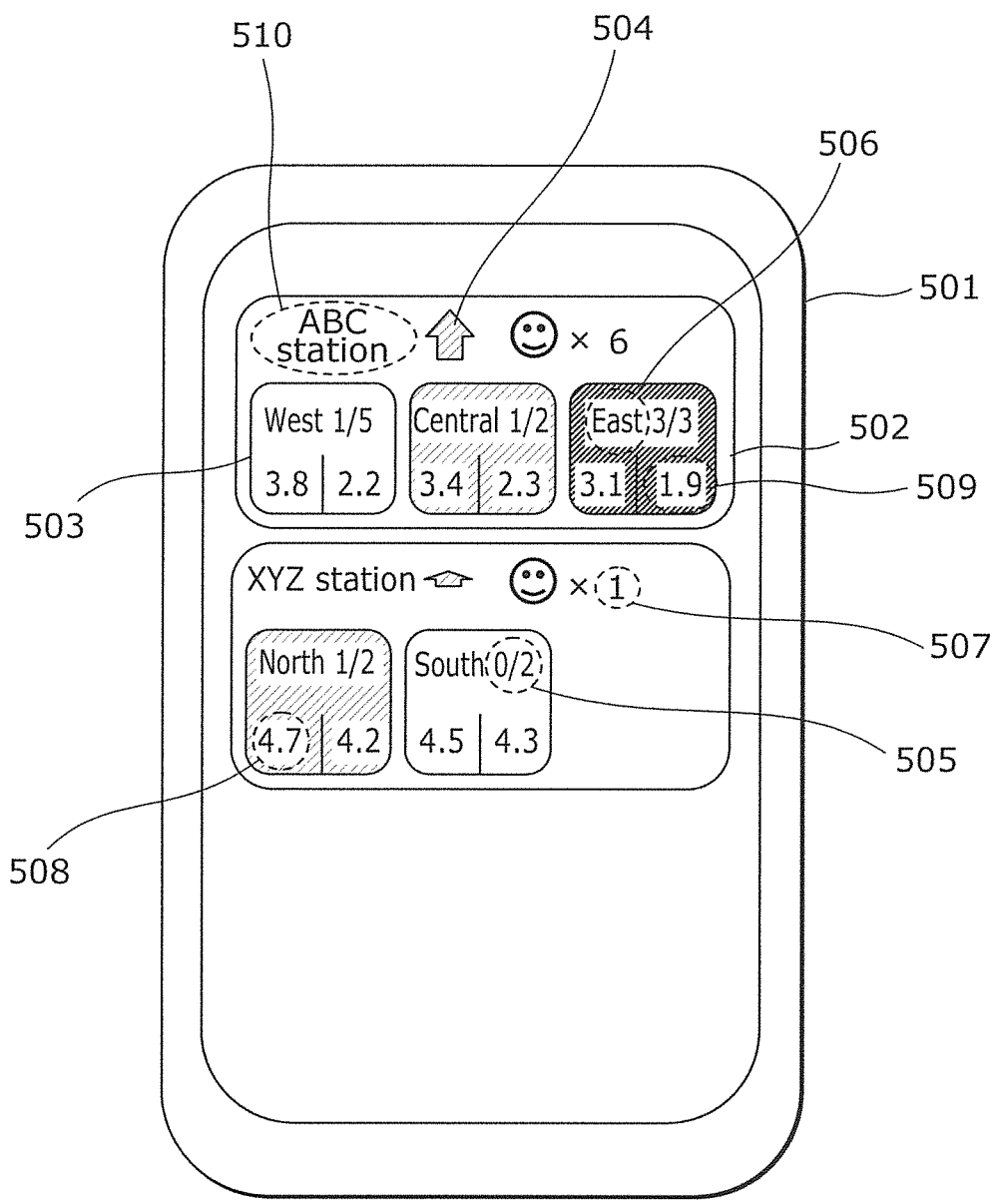
FIG. 13 is a diagram showing an example screen displaying busy statuses of lavatories at stations on a smartphone.

In the following, an example will be described where the information presentation device 105 is a mobile terminal owned by the user, such a smartphone, focusing on a busy status of a lavatory at a station, FIG. 13 shows an example display displaying busy statuses of lavatories at stations on a smartphone 501.

On the screen of the smartphone 501, as illustrated in the figure, boxes 502 separated station by station are displayed, and a station name 510 is displayed in each box 502. The stations displayed herein are determined based on, for example, location information of a user. If the user is on a train, the next stop (ABC station in FIG. 5) and the next next stop (XYZ station in FIG. 5) may be displayed. This allows the user to check for a lavatory at a station nearest the current location, thereby allowing the user to check for a lavatory which the user can arrive in a shorter time. If the user is other than being on a train (at a station), the station the user is currently at and the surrounding stations may be displayed.

Moreover, in the box 502 of a station, boxes 503 of lavatories may be displayed, showing all lavatories (stalls) installed at that station. This allows the user to check for lavatory usage in a shorter time. Moreover, location information (or lavatory name) 506 may be displayed, showing the location where the lavatory is installed. This allows the user to use a lavatory in a shorter time. Moreover, a FIG. 505 may be displayed, showing usage of lavatory stalls, FIG. 13 shows the number of stalls in use divided by the number of stalls installed at the lavatory. This allows the user to be aware of the current busy status of each lavatory. Moreover, the backgrounds of the boxes 503 of lavatories may be different in color or pattern, in accordance with the usage of stalls of lavatories. This can clearly covey the busy status of each lavatory to the user.

Moreover, a subjective rating value 508 obtained from users who used lavatories may be displayed. For example, users can subjectively rate lavatories after using them and an average value of neatness and cleanness of the lavatories can be displayed. This allows the user to select a subjectively highly rated (neat or clean) lavatory.

It should be noted that the wearable sensors 101c and 102c may record biometric information such as a heart rate of a user using a lavatory, and transmit the biometric information to the server 104. Accordingly, the server 104 may estimate the surges of sympathetic nerves and parasympathetic nerves of the user, based on the biometric information such as the heart rate, and use a result of the estimation as metrics as to whether a lavatory is relaxing, for example, to generate a result of the rating of each lavatory as provision information. This allows the user to select an objectively highly rated (relaxing) lavatory. While the subjective rating has an advantage of allowing a large number of measures to be set, the objective rating using the biometric information obtained from the wearable sensors worn by the user has an advantage of having more reliability than the subjective rating.

Moreover, the prediction algorithm or the information generation algorithm used by the server 104 may predict a station where each user is to get off a train, based on the historical location information of the user. Estimating, for each user, that the user often uses a public transportation of the same path at the same time on the same day of a week allows more accurate prediction of the busy status of a lavatory. Moreover, information (busy-level fluctuation information) in which a busy status of each lavatory in the future is predicted based on information on user's stops may be displayed on the smartphone 501 given that the information presentation device 105 is the smartphone 501. Busy-level fluctuation information 504 may be displayed by an arrow, for example, as shown in FIG. 13. The larger arrow represents an increase in busy status in the future, allowing the user to be aware of more available lavatories. In other words, at a station, the user can use a lavatory the waiting time for which is a shorter, avoiding busy lavatories.

Moreover, a FIG. 507 may be displayed, which indicates the number of the other users who are on the same train, checking the busy status of lavatories by mobile terminals or the like. This allows the user to be more accurately aware of an available lavatory.

Moreover, the prediction algorithm may compute the probability of use of lavatories at stations for each user, using the lifestyle information (history) or the biometric information of the user, for example. Accordingly, the information generation algorithm may compute, for each user, the likelihood, for each station, that the user uses a lavatory and a time of usage of the lavatory, based on the probability of use of lavatories at stations and the location information (history), and generate the busy-level fluctuation information 504 of lavatories at each station that reflects a result of the computation. Moreover, the information generation algorithm may generate the busy-level fluctuation information 504 so that a busy level of a lavatory at a station where the probability the user gets off a train is high is increased (the arrow is extended) based on daily historical location information of the user, for example. This allows the user to be more accurately aware of an available lavatory.

Moreover, while in FIG. 13, the example is given where the busy-level fluctuation information 504 for each station is displayed on the smartphone 501, busy-level fluctuation information for each lavatory (stalls) may be displayed. This allows the user to be more accurately aware of an available lavatory. For example, based on information on daily lavatory usage for each user, a lavatory that the user has used in the past may be determined to be one that the user is likely to use, and the busy-level fluctuation information which includes an increased busy level of the lavatory (the arrow is extended) may be displayed. This allows the user to be more accurately aware of an available lavatory.

Moreover, the information generation algorithm may predict that the user is likely to use a lavatory at a location closer to the car where the user is on, based on information on the car where the user is on, and generate busy-level fluctuation information. This allows the user to be more accurately aware of an available lavatory.

Moreover, using means for storing a long-term (e.g., a period of a week or more) use history of a lavatory (at home or a station, preferably both) for each user, the prediction algorithm may predict the likelihood that the user uses a lavatory, based on the use history. For example, the prediction algorithm may distinguish between users who often use a lavatory before and after leaving for work and users who rarely use a lavatory before and after leaving for work to estimate personal habits and predict that a user, who is estimated to often use a lavatory at home before leaving for work and has missed to use the lavatory at home, is more likely to use a lavatory at a station.

Moreover, the wearable sensors 101c and 102c may be heart rate monitors each of which transmits to the server 104 biometric information indicating a heart rate of a user wearing the wearable sensor. In this case, the prediction algorithm executed by the server 104 may estimate that a user who has a higher heart rate is more likely to be in a state where the user wants to go to a lavatory to predict that the user is likely to go to a lavatory in the near future.

Moreover, the wearable sensors 101c and 102c may be devices which measure perspiration of a user wearing the wearable sensor to transmit to the server 104 biometric information indicating the perspiration. In this case, the prediction algorithm may estimate that a user who perspires more than usual is in the state where the user wants to go to a lavatory to predict that the user is likely to go to a lavatory in the near future.

Moreover, the wearable sensors 101c and 102c may be devices which measure blood pressure of a user wearing the wearable sensor to transmit to the server 104 biometric information indicating the blood pressure. In this case, the prediction algorithm may estimate that a user who has a higher blood pressure than usual is in the state where the user wants to go to a lavatory to predict that the user is likely to go to a lavatory in the near future.

Moreover, the information generation algorithm executed by the server 104 may estimate a train or a vehicle where each user, who is predicted to be likely to go to a lavatory, is riding, based on the location information of the user to generate busy-level fluctuation information so that the busy level of a lavatory increases at a station near the location of the user at a time the user exits. The server 104 transmits the busy-level fluctuation information to a smartphone or the like of the user, allowing the user to be more accurately aware of an available lavatory.

As described above, the server 104 executes the prediction algorithm to predict the user's probability of using a lavatory at a station. Then, the server 104 executes the information generation algorithm to generate the busy-level fluctuation information 504 integrating the user's probability of using a lavatory at a station and the information that is estimated from daily historical location information of the user, such as the user's stop or the location of a lavatory often used by the user. Due to this, the busy-level fluctuation information 504 indicates a result of more accurate prediction of the information on the busy level of a lavatory. Moreover, the busy-level fluctuation information 504 can be transmitted to and presented on the smartphone 501 of the user. This allows the user using the smartphone 501 to be more accurately aware of an available lavatory.

Moreover, the information providing system according to the present embodiment may further include an environmental information acquisition terminal which is connected to the network 103. The environmental information acquisition terminal detects air temperature and communicates it to the server 104. The provision information generating unit 92 of the server 104 may estimate that lower air temperature increases the busy level of a lavatory, based on the information on air temperature, and generate the busy-level fluctuation information 504 that reflects the air temperature. The server 104 transmits the busy-level fluctuation information 504 to the smartphone 501, thereby allowing the user to be more accurately aware of the fluctuation in busy level on a lavatory.

Moreover, in the information providing system according to the present embodiment, the home appliances 101a and 102a each may include, in addition to the toilet, a coffee maker which includes communication functionalities. This allows coffee maker usage to be collected as the lifestyle information at the server 104, in addition to the toilet usage. Since beverages such as coffee have high diuretic effects, if the user is a woman, the busy level of lavatory stalls at stations increases. Thus, the prediction algorithm executed by the server 104 may identify whether each user drunk coffee before leaving for work to predict the likelihood that the user uses a lavatory. The user, who checks the busy-level fluctuation information 504 reflected a result of the prediction on the smartphone 501 can be more accurately aware of an available lavatory. It should be noted that the server 104 collects genders of the users as the attribute information from the information input terminals 101d and 102d and conducts prediction based on this, thereby presenting to the users the busy-level fluctuation information which is generated distinguishing between busy statuses of men's and women's lavatories. It should be noted that the attribute information may not include gender and the server 104 may obtain locations of men's lavatories and women's lavatories at stations to identify whether each user used any of the lavatories in the past from the historical location information of the user and estimate the gender of the user.

It should be noted that in the specific examples of the present embodiment (the examples where the home appliances are toilets and others), the mobile 101b, the information input terminal 101d, the information presentation device 105, and the server 104 shown in FIG. 2 may be integrated as the mobile 101e (see FIG. 10).

The examples of the information providing system, which provides the information on the prediction of a busy status of a lavatory at a station and the like, have been described, wherein the home appliances 101a and 102a are toilets in the houses. A lavatory in a house and a lavatory at a station, for example, are means for accomplishing a similar purpose. Thus, the prediction is based on a given connection between the lavatory usage in a house and the demand or the busy status of a lavatory at a station, for example, and is thus effective.

(Embodiment 4)

Hereinafter, refrigerators by way of example of the home appliances 101a and 102a in the above-described information providing system 100 will be mainly described, with reference to FIGS. 1 and 2.

The information providing system according to the present embodiment estimates a meal time for each user.

In the information providing system according to the present embodiment, home appliances 101a and 102a which are refrigerators, each have communication functionalities and include means (a detection mechanism) for detecting use of the refrigerator by a user (individual). The detection mechanism includes open/close sensors of a refrigerator door, and every time the user opens the refrigerator door the refrigerator transmits to the server 104 lifestyle information indicating that the refrigerator is used (e.g., time at which the door is opened), and a refrigerator ID (the home appliance ID) for identifying the refrigerator via the network 103. It should be noted that for a refrigerator having a plurality of doors, the refrigerator also sends to the server 104 information for identifying a cabinet (such as a vegetable cabinet, a refrigerator cabinet, a freezer cabinet, and an ice maker cabinet) that is opened by a door in the lifestyle information.

The server 104 can collect refrigerator usage history (e.g., information on a cabinet used at each time of use) for each user. The use history allows the server 104 to estimate a meal time slot of the user to predict user behavior, such as the next meal time, and provide the information presentation device 105 with provision information which is generated based on a result of the prediction and the location information of the user. The provision information is presented by the information presentation device 105 to a movie theater operating company, for example. Having seen the provision information, the movie theater operating company can know plans for meals of users, who came to a movie theater, after watching movies. For example, if a large percentage of the users is predicted to be hungry due to a fact that a long time has elapsed since an average meal time of the users who came to the movie theater, the server 104 can provide, before movies are shown, advertisements related to meals, an information presentation device 105 installed at the theater broadcasts the advertisements related to meals. This can broadcast the advertisements effectively.

Moreover, if the server 104 generates, as the provision information, information indicating the percentage of hungry users after watching movies, the movie theater operating company or the like having obtained this information via the information presentation device 105 can effectively provide services, such as distributing discounted tickets to neighboring restaurants, when the percentage of hungry users is high.

It should be noted that the prediction algorithm executed by the server 104 may predict the next meal time of each user, distinguishing between a vegetable cabinet, a freezer cabinet, an ice maker cabinet, for example, based on the lifestyle information which indicates a time at which each cabinet of the refrigerator is opened. This can determine a prediction algorithm that can more accurately estimate a meal time of each user, thereby more accurately predicting the next meal time.

Moreover, the home appliances 101a and 102a may not be refrigerators but devices each having communication functionalities, such as a lighting fixture, an induction cooktop, and a microwave oven at a dinning room or a kitchen. Since intended use of these devices are closely related to meals, as with the case where the home appliances 101a and 102a are refrigerators, the meal time of the user can be estimated also based on lifestyle information which indicates the usage (e.g., time of use) of the devices. It should be noted that the home appliances 101a and 102a may each include a plurality of devices, such as the refrigerator, a lighting fixture, an induction cooktop, and a microwave oven at a dinning room or a kitchen. This allows more accurate estimation of a meal time of the user.

Moreover, the wearable sensors 101c and 102c may be glucose meters. This allows the server 104 to collect biometric information which indicates a blood glucose level for each a user, allowing the server 104 to estimate whether the user is hungry from historical blood glucose level, thereby more accurately predicting the next meal time of the user.

Moreover, the information presentation device 105 may be a mobile terminal, such as a smartphone or a tablet, for providing the user with information. This allows the server 104 to provide pinpoint advertisements, such as a recommended restaurant, to a user owing the mobile terminal which is the information presentation device 105. It should be noted that the server 104 may provide each user with an advertisement of a restaurant close to the current location of the user, for example. Moreover, the server 104 may predict, based on the historical location information of the user, a path of travel of the user in the near future from the current location, and provide an advertisement of a restaurant close to the predicted path. In the advertisement, information, such as the restaurant name, meal menu, the location of the restaurant, discount, and a privileged service, or user condition (see the condition 301 of FIG. 12) which is estimated based on the lifestyle information or the biometric information may be displayed.

Moreover, the wearable sensors 101c and 102c may be devices that have functionalities of measuring various component concentrations in blood, such as neutral fats and cholesterol, and transmit to the server 104 the measured various component concentrations in blood as biometric information. Since the server 104 can estimate a health status for each user based on the obtained biometric information, the server 104 may generate provision information proposing a meal which is effective for improving the health of the user and distribute the provision information to the mobile terminal of the user as the information presentation device 105. The user condition (see the condition 301 of FIG. 12) displayed on the mobile terminal may include information, such as the various component concentrations in blood, and the possibility that the user fits to hyperlipemia, hypercholesterolemia, or diabetes, for example. This allows the user to select a meal that is effective for improving the health of the user.

Moreover, the users may provide the information input terminals 101d and 102d with input of user's chronic health problems or constitutions, for example, and the input may be transmitted to the server 104 in the attribute information. This allows the server 104 to generate and provide the users with provision information suited to improved health of each user, based on the user's chronic health problem or constitution. Moreover, in response to the input from the users, the information input terminals 101d and 102d may transmit to the server 104 attribute information including information, such as user's favorite food, whether the user is on a diet, and whether the user is a smoker. This allows the server 104 to generate provision information suited to each user.

It should be noted that in the specific examples of the present embodiment (the examples where the home appliances are refrigerators and others) also, the mobile 101b, the information input terminal 101d, the information presentation device 105, and the server 104 shown in FIG. 2 may be integrated as the mobile 101e (see FIG. 10).

(Embodiment 5)

In the following, a variation of the provision information generated by the server 104 in the information providing system described in the embodiment 4 will be described. In other words, an example will be described where the meal-related provision information which is generated, for each user, by the server 104 based on the lifestyle information, the biometric information, the location information, for example, is provided in a rank format.

Here, the rank format is a format in which items (elements of information) in the provision information are ordered based on a given rating parameter (numeric value), and sequenced in order. Moreover, the ordering is referred to as ranking.

For example, when the users have meal at restaurants, the wearable sensors 101c and 102c may measure biometric information for each user, such as the heart rate, before and after the meal, and the server 104 may collect the information via the network 103. In doing so, the server estimates a degree of parasympathetic nerve activities when each user is having a meal, from the heart rate, for example, thereby rating effects of restaurants and meal menu for stimulating parasympathetic nerves. Thus, the provision information generating unit 92 of the server 104 may generate provision information which represents restaurants and meal menu in a rank format, according to a numeric value indicating a result of the rating. The provision information is transmitted from the server 104 to an information presentation device 105, which is a smartphone or the like of each user, for example, and the information presentation device 105 displays the provision information on a screen, for example.

Figure 14:
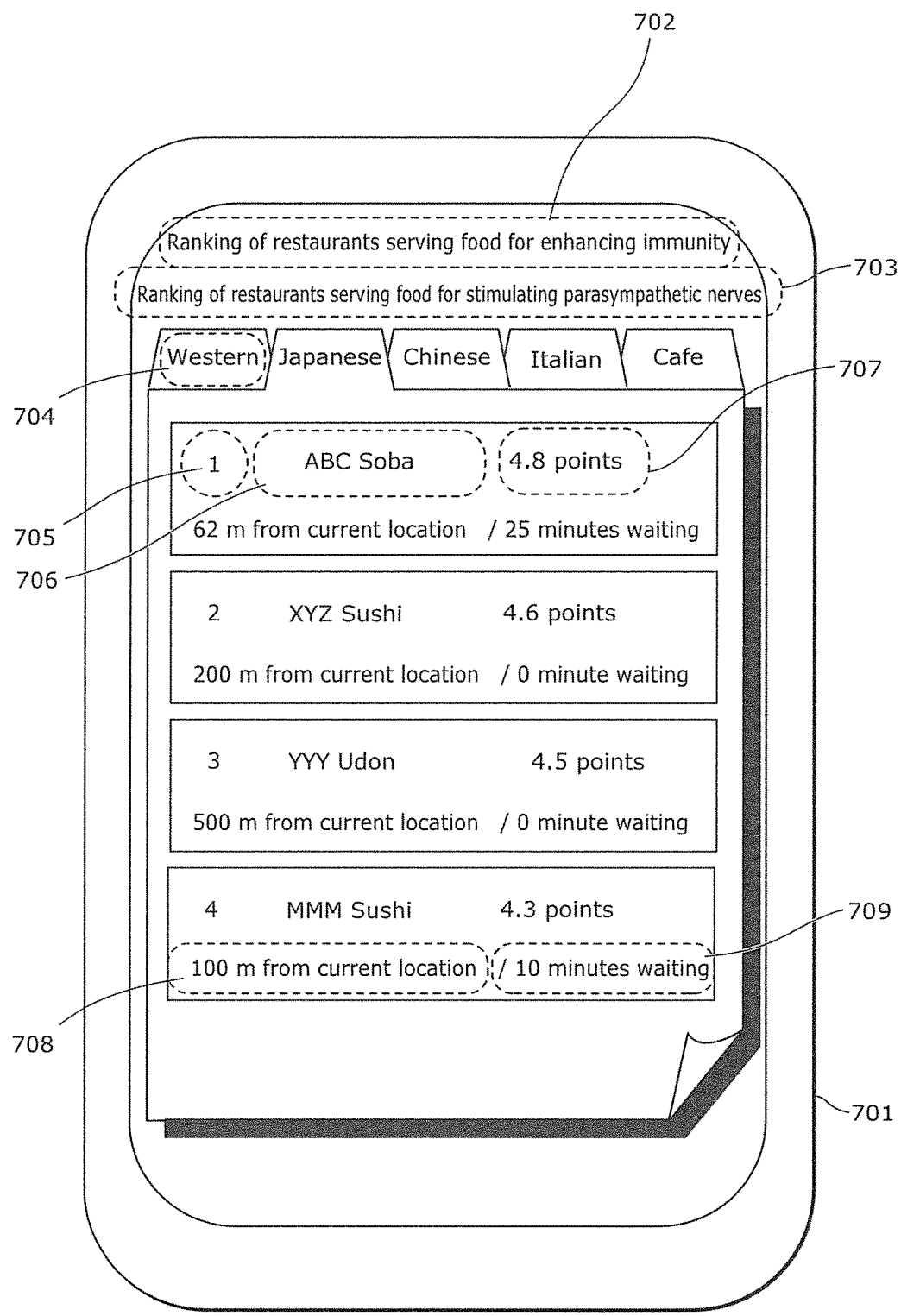
FIG. 14 is a diagram showing an example screen displaying restaurants in a rank format on a smartphone.

FIG. 14 shows an example display displaying restaurants in a rank format on a smartphone 701.

Each user who sees the screen shown in FIG. 14 can search a restaurant suited to user's preference or for improved health. In recent years, restaurant ranking by individual's subjective rating, such as so-called word of mouth, is widely known. However, ranking that is based on the biometric information as shown in the present embodiment has less potential of manipulation of information, and thus more reliable.

In the following, the example display shown in FIG. 14 will be described.

On the screen of the smartphone 701, included are: a title 702, noted as "Ranking of restaurants serving food for enhancing immunity;" a subtitle 703, noted as "Ranking of restaurants serving food for stimulating parasympathetic nerves;" a category 704; a rank order 705; a restaurant name 706; a rating parameter 707; a restaurant location 708; and a waiting time 709.

Here, the title 702 is information indicative of meaning (effects) of values of items indicated by the rating parameters (numeric values) which the ranking is based on.

The subtitle 703 is information indicating the meaning of the rating parameters and a method of the rating. This makes content of the rating easier for the user to understand.

The category 704 classifies meals, such as "Western," "Japanese," and "Chinese." This allows the user to select a category from which the user wants to have a meal and search a highly rated restaurant. Further subdivided categories may be used. Moreover, a plurality of hierarchical groups may be previously prepared, such as a large group category, a medium group category, and a small group category, and a user, who views the information, may be allowed to select a hierarchical group according to need. For example, the large group category may include "Japanese," "Western," "Chinese," "Italian," and "Cafe." A medium group category for "Japanese" may include "Noodles," "Bowls," "Sushi," "Japanese teishoku (set meal)," and "Yakiniku (grilled meat)," and a small group category for "Noodles" may include "Soba" and "Udon,"

The rank order 705 is descending order from a highest rating parameter (numeric value). This clearly indicates highly rated restaurants.

The restaurant location 708 is indicated by distance from the current location. The restaurant location 708 and the current waiting time 709 make it easy for the user to select a restaurant, considering a time before a meal.

Such information in the rank format is not limited to information such as restaurants highly effective for helping stimulating parasympathetic nerves, and may include information on places and shops where households with infants frequent, or information on shops where hayfever sufferers frequent or meal menu for the hayfever sufferers. For example, the home appliances 101a and 102a may be bathroom ceiling heater fans, and the server 104 may collect bathroom ceiling heater fan usage for each user as the lifestyle information. The prediction algorithm executed by the server 104 may estimate a user, who is increasingly use the bathroom ceiling heater fan in a particular season (e.g., around March) other than rainy season to be a hayfever sufferer, for example. Accordingly, the information generation algorithm executed by the server 104 may extract and generate shops where hayfever sufferers frequent as the provision information, based on the location information of shops and the historical location information of the user who is estimated to be a hayfever sufferer. It should be noted that the information generation algorithm may include a configuration to obtain weather information and estimate a user who uses the bathroom ceiling heater fan on a clear day in the particular season (e.g., around March) to be a hayfever sufferer.

Moreover, a plurality of places (such as a park, a facility, and a shop,) may be ordered based on a result of, for example, rating based on the number of users visited, who are estimated to be in particular condition based on the lifestyle information or the like, and the places may be presented in a rank format. Moreover, information on each user condition estimated based on the lifestyle information or the like may be presented in a format distinguishing on a condition-by-condition basis.

Moreover, the information generation algorithm executed by the server 104 may extract places where households with infants frequent, based on the historical location information of a user for each household estimated to have an infant, and generate the provision information from the extraction. It should be noted that the method shown in the embodiment 2, for example, may be used to estimate a household with an infant.

Moreover, in the case where the lifestyle information which indicates, for example, how long lighting in a children's room is used can be collected from the home appliance, if the duration of use of lighting is increased as compared to the previous year, it can be estimated that the household is with a student who is an applicant preparing for an examination. Moreover, in the case where the lifestyle information which indicates duration of use of the home appliance in the household can be collected from the home appliance, if frequency of use of the home appliance on daytime is less than nighttime, it can be estimated that a user of the home appliance is of a two-income couple. As such, characteristics of users may be extracted from the lifestyle information, and users having the same characteristics may be grouped, and restaurants or meal menu may be ranked as described above for each group.

Moreover, the user characteristics obtained based on the lifestyle information, restaurants used by the users and are obtained based on the location information, and rating of restaurants obtained based on the biometric information may be ranked together. Information better suited to users can be provided by ranking for each category based on user characteristics, such as ranking of restaurants serving food for enhancing immunity of a household with an infant or ranking of restaurants serving food for enhancing immunity of hayfever sufferers, for example.

Moreover, while the example shown in FIG. 14 is the content that is generated based on the biometric information indicating the heart rate, the biometric information may be other than heart rate. For example, in the case where the wearable sensors 101c and 102c are clinical thermometers and the biometric information indicating body temperature is used, ranking of restaurants serving food for warming body of the user can be provided based on results of measurement of body temperature before and after having food and drink.

Moreover, not limiting to the ranking of restaurants as described above, other places and facilities may be ranked as well. For example, heart rates before and after having food and drink or before and after having a bath are measured, and surges of parasympathetic nerve activities or a degree of the user being relaxed is estimated, thereby allowing ranking restaurants or spa which induce relaxing effects. Moreover, collecting the location information of each user whose sympathetic nerve activity surges allows ranking amusement parks (attractions) which provide excitement to the user. As such, in the information providing system, collecting the biometric information of a group of users allows variety pieces of information to be provided in a rank format. It should be noted that the rank formats described herein are applicable as a format whereby the information in each embodiment is presented.

(Embodiment 6)

Hereinafter, a vehicle navigation device, mounted on the vehicle, by way of example of the mobiles 101b and 102b and the information presentation device 105 in the information providing system 100 set forth above will be mainly described, with reference to FIGS. 1 and 2.

An information providing system according to the present embodiment proposes a route that is suited to a user driving a vehicle, in accordance with lifestyle information which is obtained from a home appliance based on the usage of the home appliance by the user. It should be noted that the proposed path is different depending on a user.

Herein, first, suppose that the home appliances 101a and 102a are toilets in the houses as shown in the embodiment 3, and toilet usage (e.g., time of use, duration of use) is transmitted as the lifestyle information to the server 104.

The server 104 accumulates a toilet usage history for each user, for example, estimates whether the user is in a state where the user wants to use a lavatory outside household, based on a predetermined prediction algorithm to predict likelihood that the user uses an external lavatory. Moreover, based on a predetermined information generation algorithm, the server 104 generates provision information for proposing an appropriate route of travel for vehicle navigation, in accordance with whether the user is likely to use a lavatory, based on the location information of the user. The server 104 then transmits the provision information to the information presentation device 105 which is a vehicle navigation device owned by the user. In response, the information presentation device 105 presents the route of travel.

It should be noted that regarding the processing (a travel route presentation process) for proposing a route of travel, of estimating and predicting the user condition and generating and presenting the provision information, the configuration of partitioning the processing between the server 104 and the information presentation device 105 on the system configuration can vary. The information presentation device 105, which is the vehicle navigation device, may generate some of the provision information. Alternatively, the server 104 may receive information input from the user through the information presentation device 105, such as a destination, and generate provision information indicating the route of travel. For example, as a system configuration, the mobile 101b, the information input terminal 101d, the information presentation device 105, and the server 104 may be integrated as the mobile 101e as shown in FIG. 10.

It should be noted that in the following, for purposes of description, description continues where the information providing system 100 has the system configuration as shown in FIG. 10 and the mobile 101e is the vehicle navigation device mounted in the vehicle.

The mobile 101e obtains map information including information, such as locations of roads and locations of toilet provider facilities by externally receiving them, for example. The mobile 101e includes functions needed for vehicle navigation. The location information of the toilet provider facilities are provided by, for example, the toilet provider facilities or a service provider which provides map information for vehicle navigation.

Figure 15:
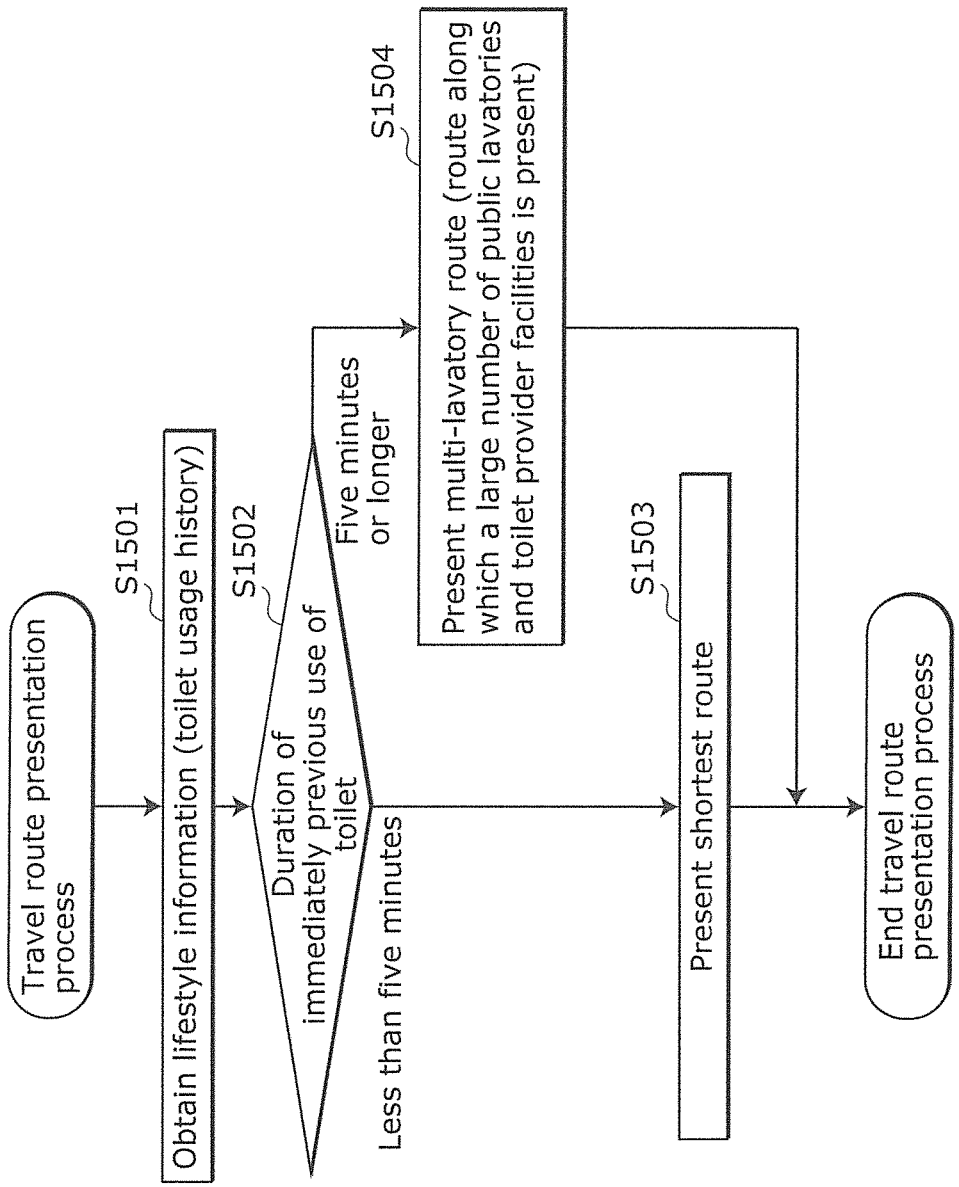
FIG. 15 is a flowchart illustrating a travel route presentation process using lifestyle information on use of toilet.

FIG. 15 is a flowchart illustrating the travel route presentation process using the lifestyle information on use of toilet.

As illustrated in the figure, the mobile 101e obtains toilet usage history information for each user in a household (step S1501), and determines whether duration (a time of stay) of immediately previous use of the toilet (before getting in a vehicle) is less than five minutes (step S1502). If the duration of use is less than five minutes, the mobile 101e presents a shortest route to a pre-set destination (step S1503). If the duration of use is five minutes or longer, the mobile 101e presents a route (Hereinafter, referred to as "a multi-lavatory route.") along which a greater number of public lavatories and toilet provider facilities (e.g., convenience stores) is present (step S1504). The travel route presentation process is a process, assuming that if duration of use of toilet is about five minutes or longer, it is estimated that the user has diarrhea. This allows proposal, to a user who has diarrhea, of a multi-lavatory route where the user can drive without worry.

Moreover, the travel route presentation process may receive selection by the user.

Figure 16:
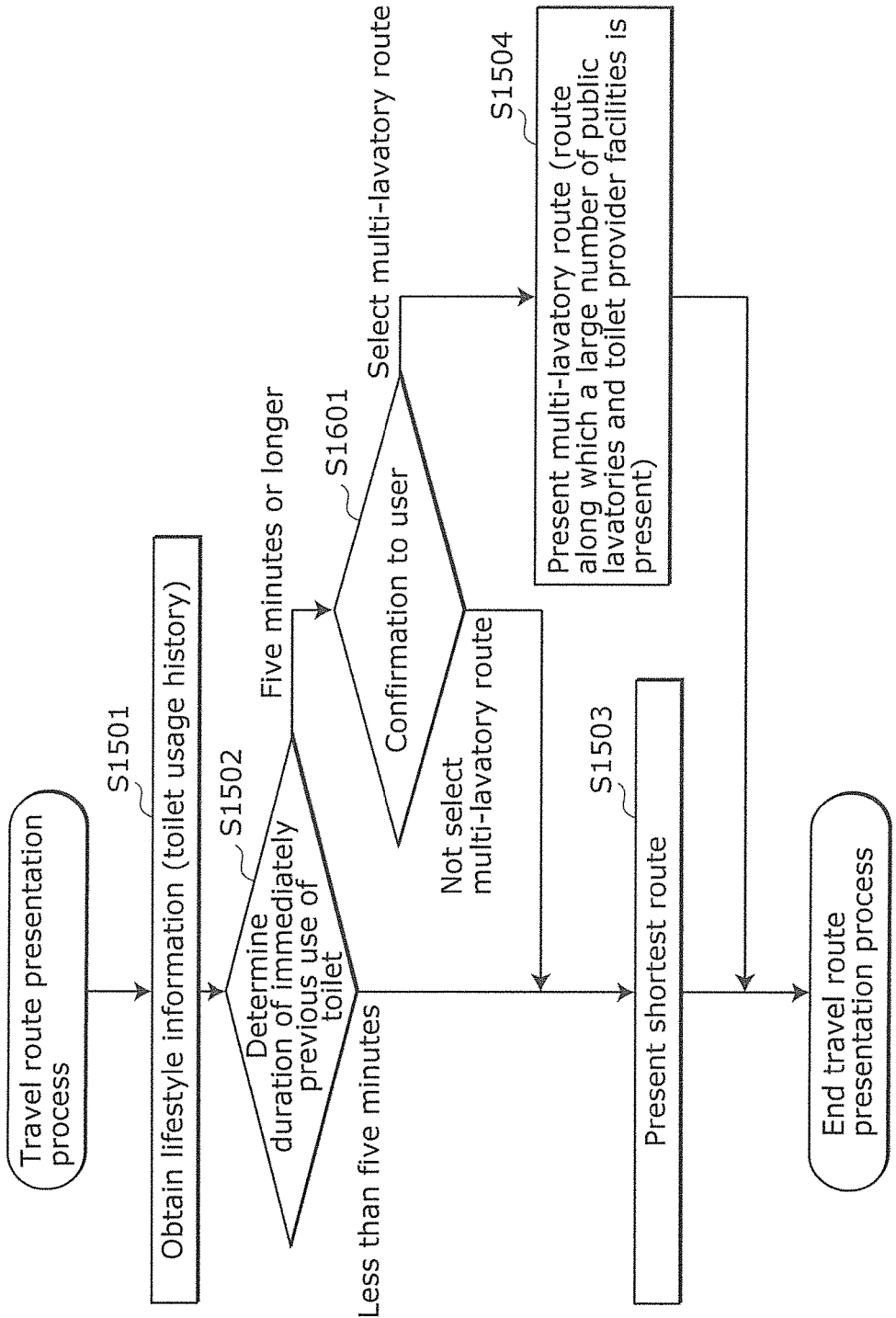
FIG. 16 is a flowchart illustrating a travel route presentation process including user selection.

FIG. 16 is a flowchart illustrating a travel route presentation process including user selection.

As illustrated in the figure, the mobile 101e obtains the toilet usage history information of the user in the household (step S1501), and determines whether duration (a time of stay) of immediately previous use of the toilet (before getting in a vehicle) is less than five minutes (step S1502). If the duration of use is less than five minutes, the mobile 101e presents a shortest route to a pre-set destination (step S1503). If the duration of use is five minutes or longer in step S1502, the mobile 101e receives selection input from the user as to whether the user wishes for presentation of a multi-lavatory route (step S1601), and presets a multi-lavatory route only if the multi-lavatory route is selected (step S1504). This allows proposal of a multi-lavatory route to a user who is really in need for it.

In the following, a user interface (screen) of the vehicle navigation device when the multi-lavatory route is presented to the user in step S1504 of FIG. 16 will be described. It should be noted that the vehicle navigation device includes a touch panel, allowing the user to make selection by touching a button displayed on the screen, for example.

Figure 17:
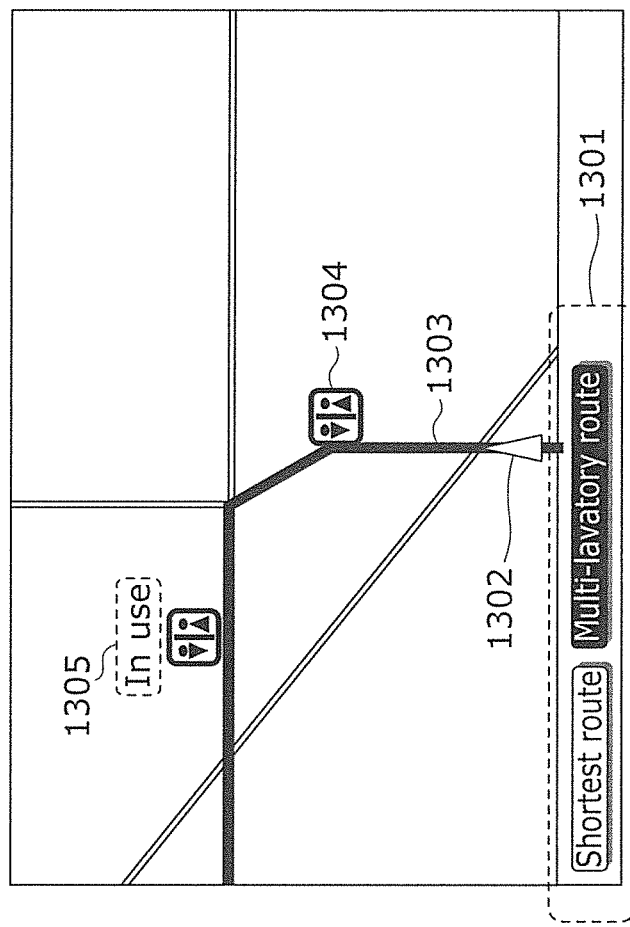
FIG. 17 is a diagram showing a screen of a vehicle navigation device where a multi-lavatory route is selectively displayed.
Figure 18:
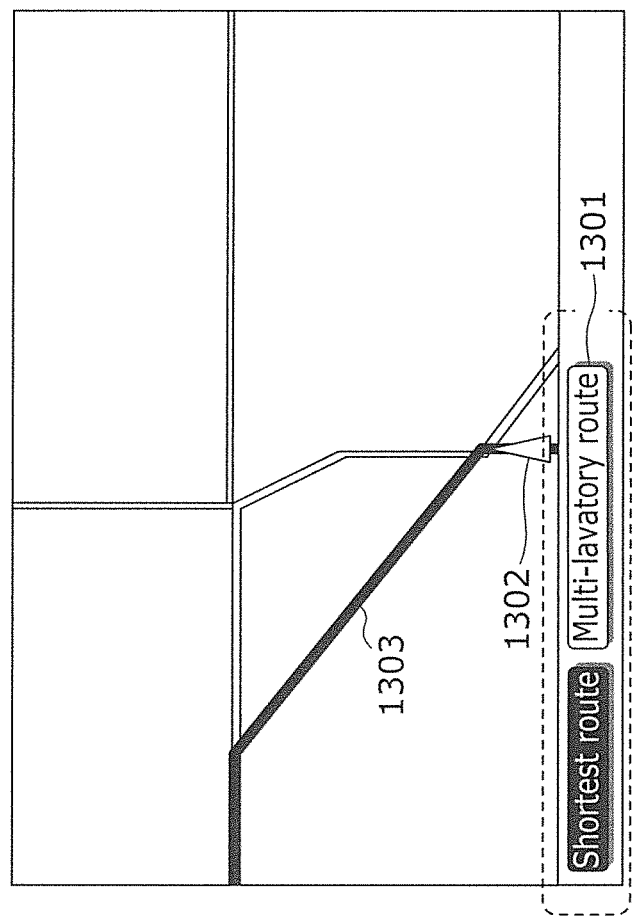
FIG. 18 is a diagram showing the screen of the vehicle navigation device where a shortest route is selectively displayed.

FIG. 17 shows the screen of the vehicle navigation device where the multi-lavatory route is selectively displayed, in addition to a map. FIG. 18 shows the screen of the vehicle navigation device where a shortest route is selectively displayed, in addition to the map.

Route selection buttons 1301 shown in FIGS. 17 and 18 are for allowing the user to select one of a shortest route and a multi-lavatory route. The user can make selection by touching a region where a button is displayed. The currently displayed one of the shortest route or the multi-lavatory route is highlighted (displayed in reverse type). In other words, the multi-lavatory route is selectively displayed in FIG. 17, and the shortest route is selectively displayed in FIG. 18.

In the figure, a mark 1302 represents the current location of the user on a map, and a route 1303 indicates a route of travel by a bold line. A lavatory sign 1304 represents a location of a toilet provider facility on a map, and an in-use mark 1305 represents that a lavatory indicated thereby is in use.

As illustrated in FIG. 17, a lavatory signs 1304 are displayed at the locations of toilet provider facilities on the route of travel for a user who has chosen multi-lavatory route. This allows the user to be readily aware of the location of a lavatory.

The in-use mark 1305 is displayed on the side of a lavatory sign 1304 indicating that all lavatories (stalls) installed at the toilet provider facility are unavailable. This allows the user to select a lavatory predicted to be available in a short time.

Moreover, although not shown, the number of lavatories (stalls) installed at each toilet provider facility may be displayed next to the lavatory sign 1304. This allows the user to estimate an available lavatory in a shorter time.

Moreover, while the foregoing example gives the alternative between a shortest route and a multi-lavatory route, three or more routes of travel may be presented, such as "Fastest route," "Shortest route," "Energy-saving route," "Street-only route," and "Multi-lavatory route," as shown in FIG. 19. The user can select a desired route of travel, among a large number of routes of travel, by touching around the text area of a route name of the desired route.

Moreover, as illustrated in FIG. 19, expected time to arrive at the destination for each route of travel, if selected, may be displayed. This allows the user to be aware of the advantages and disadvantages of selecting each route of travel, thereby accurately selecting a desired route of travel. Moreover, as illustrated in FIG. 19, an expected amount of fuel consumed for each route of travel, if selected, to arrive at the destination may be displayed. This also allows the user to be aware of the advantages and disadvantages for each route of travel, thereby accurately selecting a desired route of travel. It should be noted that in the example display of FIG. 19, liter is used as a unit for fuel to correspond to gasoline-powered vehicles, hybrid-powered vehicles, or the like. However, electric energy unit, such as "Wh", may be used to correspond to electric vehicles, fuel-cell vehicles, or the like. Alternatively, required electricity rate price may be used as the unit. In the case where the unit is displayed in price, if the route of travel includes a toll road, a toll for the toll road may be added together and displayed.

Moreover, on the screen of the vehicle navigation device, information may also be displayed as to whether refueling, such as charging or gasoline refueling, is necessary before the destination, based on available fuel, such as battery power or gasoline level. This allows the user to compare the advantages and disadvantages of the routes of travel, if selected, thereby accurately selecting a desired route of travel.

In the above example, whether the user has diarrhea is estimated based on the lifestyle information which is toilet usage history. Other than this, a toilet may include means for measuring a state of body waste, the measured state may be included in the lifestyle information, and whether the user has diarrhea may be estimated based on the lifestyle information. For example, the toilet may take a picture of body waste and the generated image may be included in the lifestyle information. The image may be then analyzed to estimate whether the user has diarrhea. This allows more accurate estimation of the user condition and presentation of a best suited route of travel to the user.

In the foregoing example, whether a multi-lavatory route is to be proposed to the user is determined based on the lifestyle information, such as the duration of use of a toilet, wherein five minutes is used as a baseline with respect to the duration of immediately previous use of the toilet. The criteria, however, may be another one (another baseline obtained from the lifestyle information or the biometric information, or a baseline obtained from another lifestyle information). Alternatively, the user may be allowed to specify an algorithm for the determination.

Figure 20:
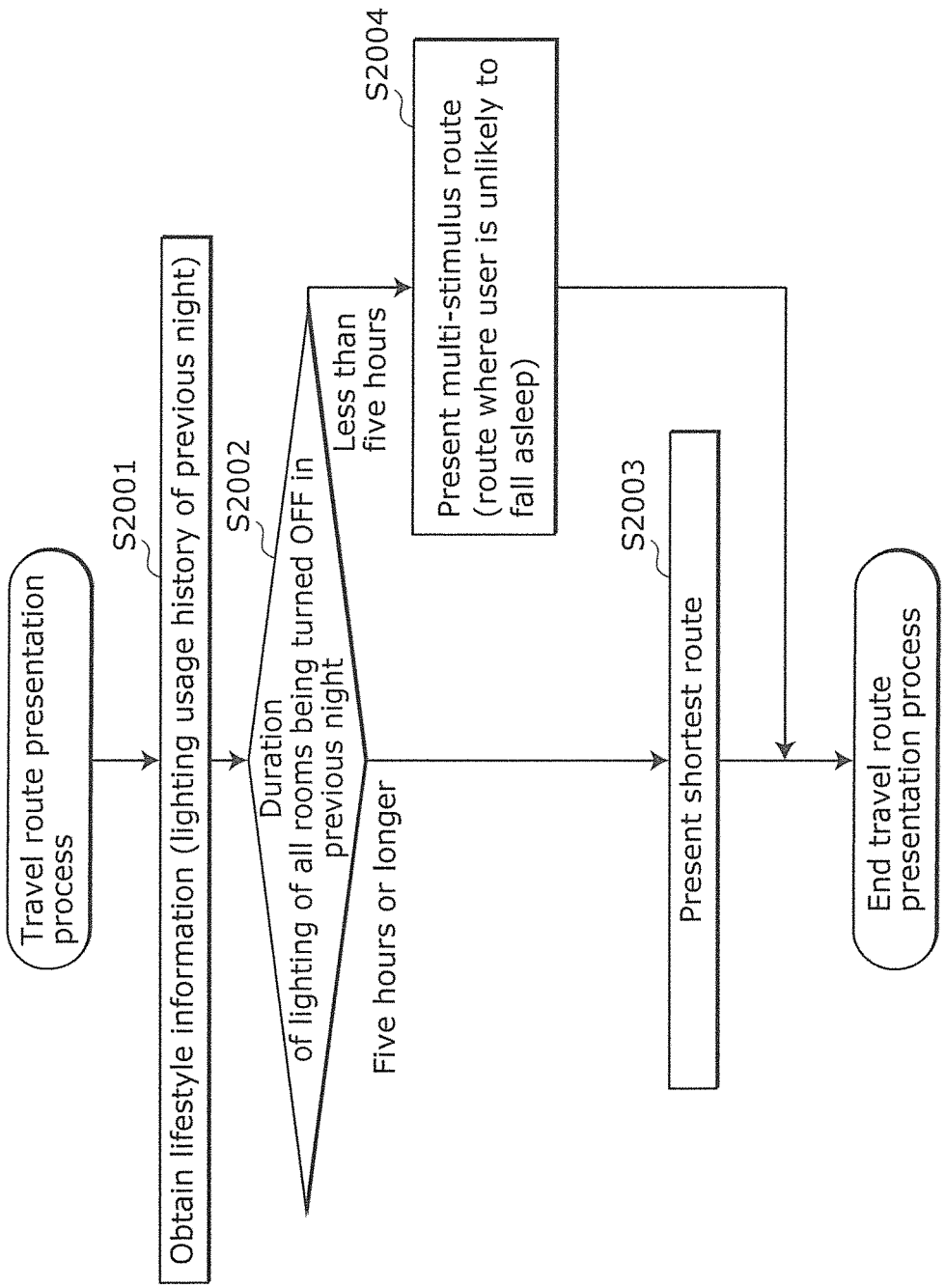
FIG. 20 is a flowchart illustrating a travel route presentation process utilizing lifestyle information on use of lighting.

Next, the configuration of the information providing system will be described in which the home appliances 101a and 102a are lighting fixtures in houses, and lighting usage (e.g., time of use, duration of use) is collected for each user as the lifestyle information, and a route of travel suited to the user is proposed based on the lifestyle information, FIG. 20 is a flowchart illustrating the travel route presentation process utilizing lifestyle information on use of lighting.

As illustrated in the figure, the mobile 101e obtains lighting usage history information of the user in the household (step S2001), and determines whether duration of lighting of all rooms being turned OFF is five hours or longer in the previous night (step S2002). If it is five hours or longer, the mobile 101e presents a shortest route to a pre-set destination (step S2003). If it is less than five hours, the mobile 101e presents a route (Hereinafter, referred to as the "multi-stimulus route.") avoiding routes where the user is likely to fall asleep, such as a highway where no road light is present (step S2004). The travel route presentation process is a process, assuming that if the duration of the lighting of all rooms being turned OFF in the previous night is five hours or longer, it is estimated that the user is short of sleep. This allows proposal, to a user who has strong sleepiness due to lack of sleep, of a multi-stimulus route where the user can drive without worry.

Moreover, for presentation of the multi-stimulus route also, similarly to the presentation of a multi-lavatory route described above, the mobile 101e may receive selection made by the user to present the multi-stimulus route only when desired by the user. For presentation of the multi-stimulus route also, the expected time to arrive at the destination may be displayed.

Moreover, the wearable sensor 101c may be a device configured with an electrode mounted on a steering wheel of the vehicle so as to be in contact with the driver's hand, and measure the heart rate of the driver via the hand. Frequency analysis can be performed on heart rate intervals, based on biometric information which indicates the heart rate. If fluctuation in the interval is simple and low, it can be estimated that the driver is sleepy. Thus, combined use of this estimation and the estimation that the user is short of sleep based on the above lifestyle information allows more accurate determination that the driver is very sleepy.

Moreover, the home appliances 101a and 102a may each include one or more meal-related devices which transmit the home appliance usage by each user (a time of use and so on) as the lifestyle information. Examples of the meal-related devices include a cooking home appliance (an induction cooktop, a refrigerator, or a microwave oven), a dishwasher, and a lighting fixture at a dinning room or a kitchen.

In this case, whether the user had a meal before going out (before getting in the vehicle) can be estimated based on the lifestyle information, and the longer the time from when the user had the meal to the user gets in the vehicle (e.g., if the user had no meal in the previous five hours), the user is predicted to be more likely to stop by at a restaurant. Thus, a route in which a large number of meal providers, such as restaurants, are at the roadside (Hereinafter, referred to as "multi-restaurant route.") may be presented. Moreover, the mobile 101e may receive selection made by the user to present a multi-restaurant route only when the user desires.

In each example described above, various routes of travel, such as a multi-lavatory route and a multi-stimulus route, are proposed to each user, based on the lifestyle information of the user. Thus, rather than presenting all routes of travel to all users, a route of travel is proposed for each user focusing on one that is predicted to be necessary for the user, thereby alleviating the burden (labor) for the user of selecting a desired route of travel.

In the following, description is given where the information providing system has the system configuration as shown in FIG. 2, and the mobiles 101b and 102b and the information presentation device 105 are included in a vehicle navigation device mounted in a vehicle.

The wearable sensors 101c and 102c may transmit biometric information, such as the user's heart rate, to the server 104, and the mobiles 101b and 102b may be vehicle navigation devices which are each mounted in a user's vehicle and transmit the location information to the server 104. In this case, the server 104 collects, for each user (driver), sleepiness based on a heart rate and the location information, for example, thereby knowing a road (location) on a map where the driver is likely to feel sleepiness. This can generate information on roads where a large number of vehicle drivers felt sleepiness on a map. Using this, a multi-stimulus route can be proposed to a user who is short of sleep or a user feeling sleepiness.

It should be noted that a degree of stimulation may be previously calculated for each road and, using this, a multi-stimulus route may be proposed. In the following, an example of a method for calculating the degree of stimulation will be shown.

For example, a reciprocal of a mean value of levels of sleepiness of a plurality of drivers may be used as the degree of stimulation. The level of sleepiness may be proportional to low fluctuation in heart rate. Moreover, to calculate the degree of stimulation, not only the biometric information on the heart rate but also the lifestyle information, such as lighting usage history, may be used together. For example, the degree of stimulation may be weighted more with a decreased length of hours slept the previous night. For example, the previous night's sleep time of each driver may be standardized, where a mean value of the previous night's sleep time of all the drivers is 1. Then, a mean value obtained by dividing, for each driver, the level of sleepiness by the previous night's sleep time (after standardization) may be calculated for each road, as the degree of stimulation.

Weighting the degree of stimulation by the previous night's sleep time as such allows a driver who had short sleep time in the previous night to be aware of stimulating roads. Thus, more appropriate road can be selected to be proposed as a multi-stimulus route to the driver who had short sleep time.

Moreover, as another example using the information on the previous night's sleep time, a mean value of levels of sleepiness, limited to drivers whose previous night's sleep time is less than five hours, may be calculated for each road. This also allows more appropriate selection of roads to be proposed as a multi-stimulus route to the driver who had short sleep time.

The above description provides the example where the information is presented to the user, using the lifestyle information and the location information. In addition to the example where the information is presented to the user, a system configuration is also possible where, for example, the use history of a toilet or lighting, or the lifestyle information, such as the information on body waste, is used to supply data (information) for controlling the devices (e.g., a device included in a mobile owned by the user).

For example, the estimation may be made that the user is short of sleep based on duration of the lighting of all rooms being turned OFF and an air conditioner mounted in the vehicle may perform control to condition air so that concentration of carbon dioxide in the vehicle decreases. This control is achieved by providing the air conditioner with control information. The concentration of carbon dioxide is measured by an air conditioner internally or externally including a concentration meter of carbon dioxide using infrared spectroscopy. Moreover, if the duration of the lighting in all rooms being turned OFF in the previous night is five hours or longer, air exchange may not be conducted between outside and inside the vehicle, and if the duration is less than five hours the air exchange may be conducted outside and inside the vehicle. This serves to reduce sleepiness of the user who is short of sleep, and also serves, for a user without sleep deprivation, to reduce power consumed by the air conditioner. Output of means (home appliance) for measuring the duration of use of a toilet or a state of body waste (components) may be used as the lifestyle information to estimate whether the user has diarrhea, and adjust air-conditioned temperature inside the vehicle in response to a result of the estimation. The air is conditioned, such as raising the set temperature for the user who has diarrhea and lowering the set temperature for the user who does not have diarrhea, thereby air conditioning in accordance with the user condition.

Moreover, it may be estimated that the user is short of sleep from the time at which the lighting of all the room is turned OFF, and the degree of braking of the vehicle may be adjusted. Heavy braking may be provided in response to depression of the brake for a driver who has insufficient sleep. This can prevent the driver, who is short of sleep and thus has high probability of causing an accident, from causing an accident, and provide a driver, who has sufficient sleep, with driving with less hard breaking and reduced load that is due to a sudden stop.

The example has been described where the biometric information on the heart rate is used to estimate sleepiness of the user (the driver). However, based on the similar biometric information, it may also be estimated that the user is in a state where an incident has happened, from changes in heart rate. Here, an incident refers to an incident that does not lead to, but may well have resulted in, a severe disaster or an accident. If there is a rapid rise in heart rate, it may be estimated that an incident has happened. The estimation of an incident is also possible based on other than the heart rate. For example, skin conductance measured by the wearable sensor, which can measure skin conductance, may be collected as the biometric information, and if there is a rapid rise in skin conductance, it may be estimated that an incident has happened. Moreover, happening of an incident may be more accurately estimated by making the estimation using both skin conductance and heart rate information. Then, a place where the incident has happened can be identified from the location information of the user (the driver). Thus, a plurality of pieces of information from a plurality of users are collected and integrated, thereby identifying places (roads) where the drivers are likely to feel frightened, and providing the user or the like with information (Hereinafter, referred to as "incident information.") on (high risk) roads where an accident is likely to happen.

Figure 21:
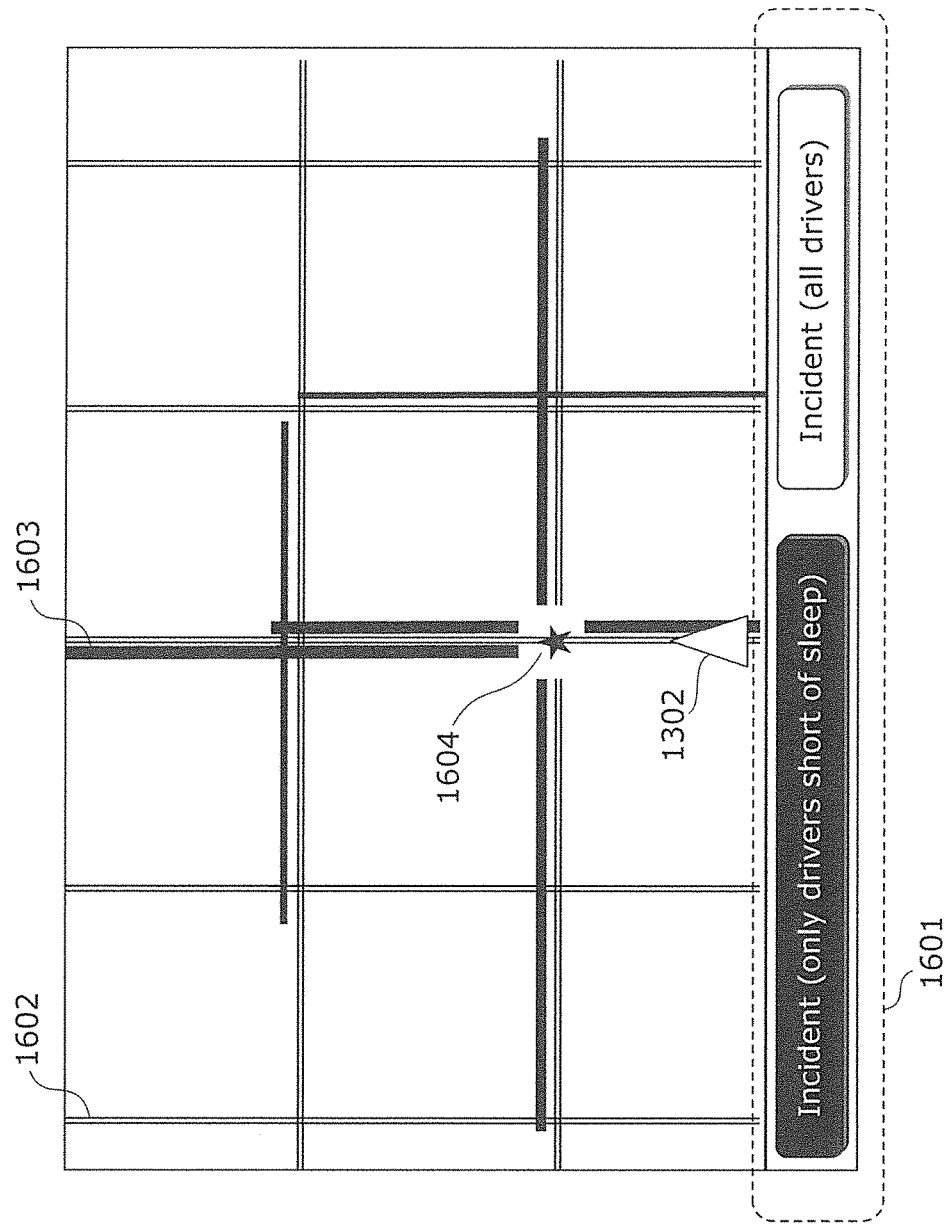
FIG. 21 is a diagram showing a screen of a vehicle navigation device displaying incident information.

FIG. 21 shows the screen of the vehicle navigation device where incident information is displayed, in addition to a map.

Incident information selection buttons 1601 shown in FIG. 21 allow the user to select either an option of displaying only incident information related to a driver who is short of sleep or an option of displaying incident information related to all drivers. The user can make the selection by touching a region where a button is displayed. The currently selected one of the option of displaying only the incident information related to a driver who is short of sleep or the option of displaying the incident information related to all drivers is highlighted (displayed in reverse type).

In the figure, a mark 1302 represents the current location of the user and the double line 1602 represents a road on a map. The bold line 1603 indicates a road where an accident is likely to happen. To distinguish whether the road where an accident is likely to happen is a forward path or a return path, the bold line 1603 is attached to a corresponding forward path or return path. Also for example, a percentage of drivers who have experienced an incident may be represented by a thickness of the bold line 1603. An attention mark 1604 is displayed on an intersection where an accident is particularly highly likely to happen. It should be noted that accident information may be collected to display the attention mark 1604 on a place where an accident has actually happened. The attention mark 1604 allows the user to be notified of a place where the user should pay particular attention.

Moreover, instead of the display of the incident information as illustrated in FIG. 21, information may be displayed with respect to places at which a large number of drivers fall in a state where the above-described level of sleepiness is high. Also for example, a waveform of a heart rate of a driver who stopped a car at a spa facility for 30 minutes or longer is measured, the surges of parasympathetic nerve activities are calculated from changes in waveform of the heart rate before and after using the spa facility and rated as a degree of the driver being relaxed, thereby identifying spa facilities for the driver to relax. Thus, spa facilities for drivers to relax can also be displayed on a map. Likewise, restaurants for drivers to relax can also be identified and displayed on the map.

Moreover, a microphone may be installed in the vehicle and the user may be measured by the number of times the user sneezes after getting in the vehicle and the measurement result may be used together with the location information of the user. Thus, a degree of air pollution is estimated from the number of times the user sneezes, thereby displaying information on the degree of air pollution on a map. In this case, if the information as to whether the user has hayfever is obtained, the information for different causes of air pollution can be separately provided on the map.

Moreover, the vehicle navigation device which has the function of obtaining the location information for each user and the function of presenting the information to the user as described above may be a mobile terminal, such as a smartphone or a tablet. This allows the user owning the mobile terminal to know appropriate route to travel (the route of travel). Moreover, the vehicle navigation device may have the function of presenting the information to the user and the mobile terminal may have the function of obtaining the location information of the user.

(Embodiment 7)

In the following, a wearable sensor 1701 by way of example of the wearable sensors 101c and 102c set forth above will be described.

Figure 22:
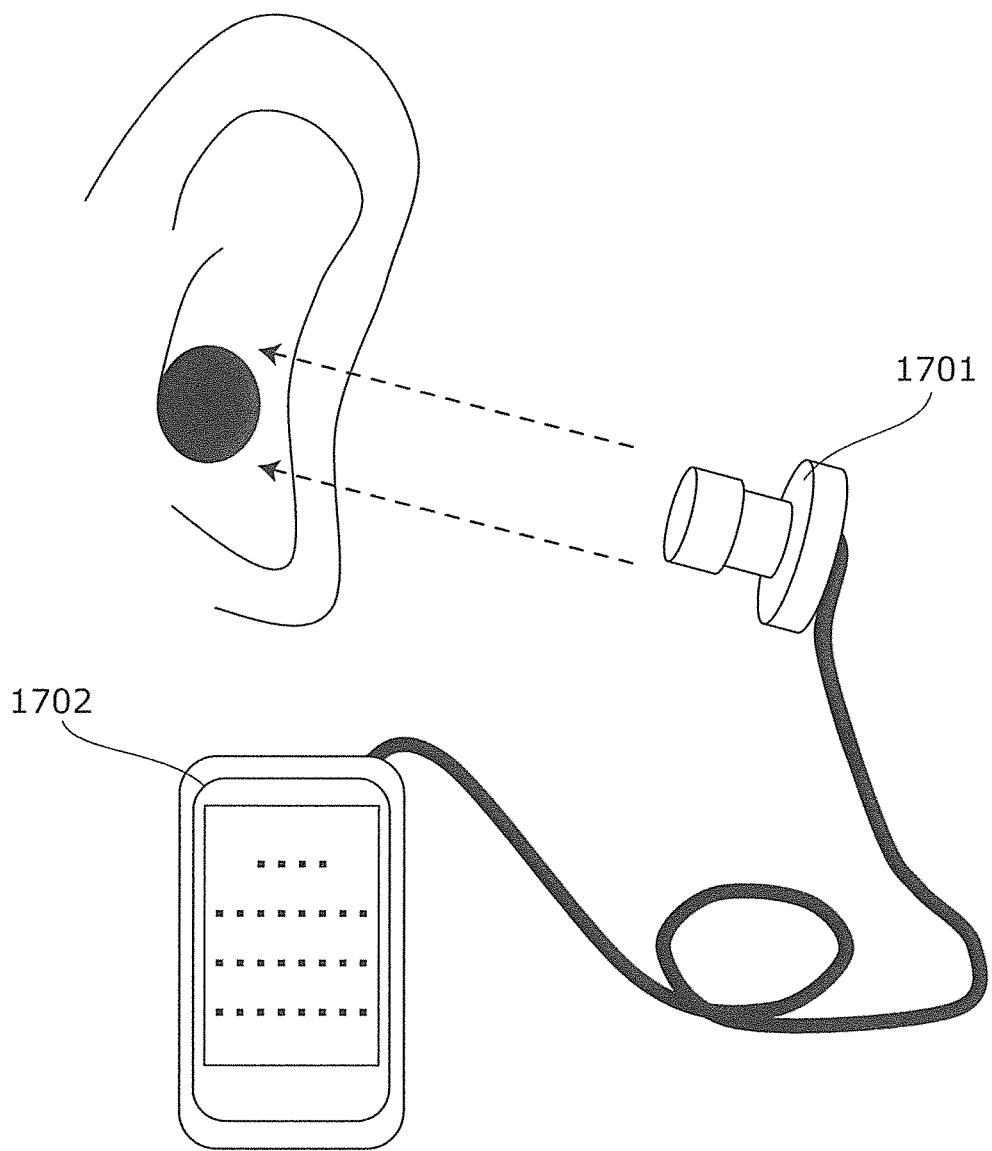
FIG. 22 is a diagram showing an example of an in-ear wearable sensor.

FIG. 22 is a diagram showing an example of an in-ear wearable sensor.

The wearable sensor 1701 is worn inserted into the ear. The wearable sensor 1701 may include at least means for measuring a sound in the ear. Various sounds can be measured in the ear. The in-ear wearable sensor 1701 measures one or more of heart sounds, breathing sounds, and voice, thereby estimating emotional condition of the user. It should be noted that a heart rate is derived from heart sounds, and a respiratory rate is derived from breathing sounds, which can be used to estimate user's emotion. Moreover, measuring the voice allows user conversation to be recorded. Furthermore, voice of a person whom the user has conversation with may also be measured. This allows the one whom the user has conversation with to be recorded as well.

Moreover, to highly precisely measure the voice of the one whom the user has conversation with, the in-ear wearable sensor 1701 may be of an unsealed type, rather than a sealed type which seals passage of air into and out of the ear.

Moreover, instead of including, therein, communication means for externally transmitting the biometric information, the wearable sensor 1701 may be connected to an information processing device 1702 which includes communication means. This can reduce the size and weight of an insert which is inserted into the ear. This also alleviates the burden, to the user, of wearing the wearable sensor 1701. It should be noted that information processing device 1702 may be the mobile 101b or 102b which detects the location information, and may further include the functionalities of the information presentation device 105.

(Supplementary)

While the embodiments of the information providing system which implements the information providing method have been described above, it is to be understood that the above embodiments are merely illustrative and various modifications can be made.

For example, the mobiles described above only need to be smartphones and vehicles that can be owned and can travel with the user. The concept of the mobile includes a device which is inside an airplane and connectable to a network, such as a device installed at each seat in the airplane, and a device included in a bus which is connectable to a network, such as an air-conditioning system in the bus. Thus, for example, the information providing system may be configured to achieve supplying control information to an air conditioner or the like to air condition along with the condition of the user who is short of sleep on an airplane or a bus, using the lifestyle information of the user. Moreover, the information providing system may be configured to achieve providing information that is suited to the user on an airplane or a bus, for example.

Part or the whole of the various processes (e.g., the processes illustrated in FIGS. 3 to 7, 11, 15, 16, and 20) performed by the devices described above may be performed by mechanisms (hardware) of the devices or executed by software. The execution of the process by software is conducted by a processor included in a device executing the control program stored in the memory. The control program may be stored in a recording medium and distributed. For example, the distributed control program is installed into the device and the processor of the device is caused to execute the program, thereby causing the device to perform the process (such as the processes illustrated in FIGS. 3 to 7, 11, 15, 16, and 20).

Figure 23:
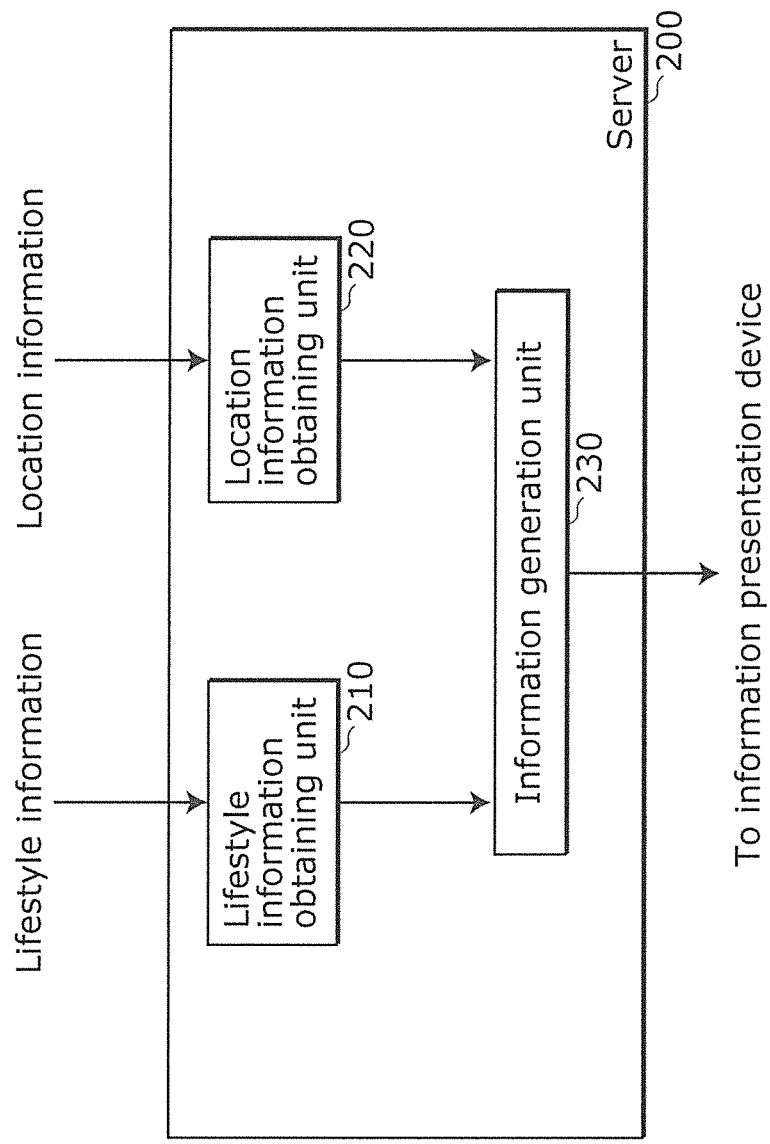
FIG. 23 is a diagram showing a configuration of the server.

Moreover, a server 200 as an aspect of the present invention, as shown in FIG. 23, includes: a lifestyle information obtaining unit 210 which obtains lifestyle information by receiving, from each of plural devices used by plural users, information on a state of operation of the device; a location information obtaining unit 220 which obtains location information of each user traveled, by receiving the location information; and an information generation unit 230 which forecasts, using a processor, demand for a particular item or a particular service at a particular place, based on the lifestyle information obtained by the lifestyle information obtaining unit 210 and the location information obtained by the location information obtaining unit 220, and generate information to be provided, based on a result of forecasting the demand.

Figure 24:
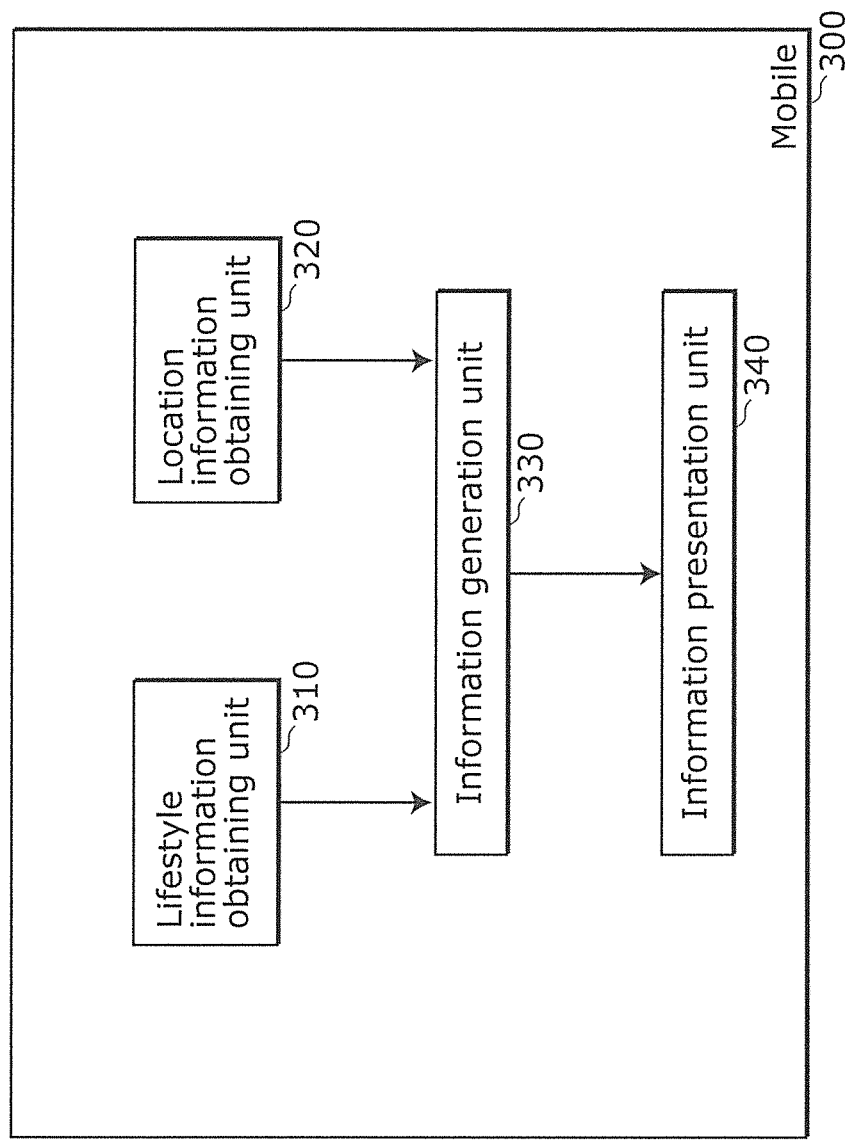
FIG. 24 is a diagram showing a configuration of the mobile.

Moreover, a mobile 300 as an aspect of the present invention is, as shown in FIG. 24, a mobile which provides a user of a device with information, the mobile including: a lifestyle information obtaining unit 310 which obtains lifestyle information, which is information on a state of the device used by the user, by receiving the lifestyle information; a location information obtaining unit 320 which obtains location information of a user by detecting a location of the user traveled; an information generation unit 330 which generates information to be provided to the user, in accordance with the lifestyle information and the location information; and an information presentation unit 340 which presents to the user the information generated by the information generation unit.

In other instances, various modifications to the above-described embodiments that may be conceived by those skilled in the art or embodiments implemented by any combination of the components and functions shown in each embodiment are also included within the scope of the present invention.

INDUSTRIAL APPLICABILITY

The present invention is useful, for example, as a server to provide information that is related to demand not necessarily correlated to the situation of the vital functions of each user based on a plurality of pieces of user information.

REFERENCE SIGNS LIST

11 Lifestyle information recording unit
12, 22, 32, 42, 52, 61, 61e Communication unit
21 Biometric information measurement unit
31, 31e Input receiving unit
41, 41e Location measuring unit
51, 51e information presentation unit
71, 71e, 210, 310 Lifestyle information obtaining unit
72, 72e Biometric information obtaining unit
73, 73e Attribute information obtaining unit
74, 74e Registration information obtaining unit
75, 75e, 220, 320 Location information obtaining unit
81, 81e Lifestyle information storage unit
82, 82e Biometric information storage unit
83, 83e Attribute information storage unit
84, 84e Registration information storage unit
85, 85e Location information storage unit
91, 91e Behavior prediction unit
92, 92e Provision information generating unit
100 Information providing system
101, 102 House
101a, 102a Home appliance
101b, 102b, 101e, 300 Mobile
101c, 102c, 1701 Wearable sensor
101d, 102d Information input terminal
103 Network
104, 200 Server
105 information presentation device
230, 330 Information generation unit
340 Information presentation unit

The invention claimed is:

1. An information providing method for generating and providing information, the information providing method comprising:
(a) forecasting, by a processor, demand for a particular item or a particular service at a particular place, in accordance with (i) a plurality of pieces of lifestyle information respectively corresponding to a plurality of users, each of the pieces of lifestyle information being obtained by a lifestyle information obtaining unit from a first device including a household device belonging to the corresponding user and including information on a state of operation of the first device and (ii) a plurality of pieces of location information respectively corresponding to the plurality of users, each of the pieces of the location information being obtained by a location information obtaining unit from a mobile device belonging to the corresponding user;
(b) generating information to be provided based on a result of forecasting the demand in step (a), wherein
in step (a), the demand is forecasted based on the number of users, from among the plurality of users, who are predicted to be at the particular place in the future and whose likelihood of being in need for the particular item or the particular service is equal to or above a certain baseline, the particular place being different from a place where the first device is installed, the particular place being identified from historical information, the historical information being a history of the obtained pieces of location information, and
the number of users is obtained by, for each of the plurality of users:
estimating a habit of the user that the user conducts a specific behavior at a particular time from the state of operation of the first device included with obtained pieces of lifestyle information corresponding to the user, the habit of the user being an estimate that the user uses the first device belonging to the user in a specific time slot;
predicting a likelihood that the user is in need for the particular item or the particular service, corresponding to the specific behavior, at a time in the future based on a mismatch between (i) the specific behavior at the particular time indicated by the habit and (ii) behavior of the user at the particular time in the past, and (iii) an estimated location of the user at the particular time, the behavior being estimated from the obtained pieces of lifestyle information corresponding to the user; and predicting a location of the user in the future from the obtained pieces of location information corresponding to the user, (c) generating control information and providing the control information to a second device when the location of the user is the predicted location which is the same as the location of the second device, the control information controlling an operation of the second device based on the generated information in step (b).

2. The information providing method according to claim 1, wherein the first device has a function of providing an item that has a same attribute as the particular item or a service that has a same attribute as the particular service, and for each of the plurality of users, the likelihood that the user is in need for the particular item or the particular service in the future is predicted in step (a), based on historical lifestyle information of the user obtained by the lifestyle information obtaining unit, the historical lifestyle information being stored in a storage medium for accumulating the plurality of pieces of lifestyle information.

3. The information providing method according to claim 2, further comprising (d) attempting, for each of the plurality of users, to obtain consent from the user to obtain the pieces of lifestyle information from the first device belonging to the user before the lifestyle information obtaining unit obtains the pieces of lifestyle information.

4. The information providing method according to claim 3, wherein in step (b), the information to be provided is generated for each of the plurality of users, and the information is generated, distinguishing between users to whom the information is to be provided, so that the information provided to a user from which the consent is obtained in step (d), from among the plurality of users, includes more content than the information provided to a user from which the consent is not obtained in step (d).

5. The information providing method according to claim 1, wherein in step (a), the demand is forecasted in accordance with a plurality of pieces of biometric information respectively corresponding to the plurality of users, each of the pieces of biometric information being obtained by a biometric information obtaining unit from a biometric measuring device belonging to the corresponding user.

6. The information providing method according to claim 1, wherein the location information obtaining unit successively obtains the plurality of pieces of location information, and the demand is successively forecasted in step (a).

7. The information providing method according to claim 1, wherein in step (b), as the information to be provided, information representing a volume of the demand is generated as a result of forecasting the demand in step (a).

8. The information providing method according to claim 1, wherein a user condition is estimated for each of the plurality of users, in accordance with the plurality of pieces of lifestyle information obtained by the lifestyle information obtaining unit and the plurality of pieces of location information obtained by the location information obtaining unit, and information indicating on a map a location of a user, from among the plurality of users, who is estimated to be in a particular condition is generated and provided.

9. The information providing method according to claim 1, wherein a user condition is estimated for each of the plurality of users, based on the plurality of pieces of lifestyle information obtained by the lifestyle information obtaining unit, and information is generated and provided distinguishing between the user conditions.

10. The information providing method according to claim 1, wherein the location of the user in the future predicted in step (b) includes a location of the user at the time in the future.

11. The information providing method according to claim 1, wherein the first device and the second device are different devices.

12. A server comprising:

a lifestyle information obtaining unit configured to obtain a plurality of pieces of lifestyle information respectively corresponding to a plurality of users, each of the pieces of lifestyle information being obtained from a first device including a household device belonging to the corresponding user and including information on a state of operation of the first device;

a location information obtaining unit configured to obtain a plurality of pieces of location information respectively corresponding to the plurality of users, each of the pieces of the location information being obtained from a mobile device belonging to the corresponding user; and an information generation unit configured to (i) forecast, using a processor, demand for a particular item or a particular service at a particular place, in accordance with the plurality of pieces of lifestyle information obtained by the lifestyle information obtaining unit and the plurality of pieces of location information obtained by the location information obtaining unit, (ii) generate information to be provided, based on a result of forecasting the demand, wherein the information generation unit forecasts the demand based on the number of users, from among the plurality of users, who are predicted to be at the particular place in the future and whose likelihood of being in need for the particular item or the particular service is equal to or above a certain baseline, the particular place being different from a place where the first device is installed, the particular place being identified from historical information, the historical information being a history of the obtained pieces of location information, and the information generation unit obtains the number of users by, for each of the plurality of users:

estimating a habit of the user that the user conducts specific behavior at a particular time from the state of operation of the first device included with obtained pieces of lifestyle information corresponding to the user, the habit of the user being an estimate that the user uses the first device belonging to the user in a specific time slot;

predicting a likelihood that the user is in need for the particular item or the particular service, corresponding to the specific behavior, at a time in the future based on a mismatch between (i) the specific behavior at the particular time indicated by the habit and (ii) behavior of the user at the particular time in the past, and (iii) an estimated location of the user at the particular time, the behavior being estimated from the obtained pieces of lifestyle information corresponding to the user; and predicting a location of the user in the future from the obtained pieces of location information corresponding to the user, (iii) generate control information and provide the control information to a second device when the predicted location of the user is a location which is the same as the location of the second device, the control information controlling an operation of the second device based on the generated information in step (ii).

13. The server according to claim 12, wherein the location of the user in the future predicted by the information generation unit includes a location of the user at the time in the future.

14. The server according to claim 12, wherein the first device and the second device are different devices.

* * * * *